(12) United States Patent
Shida

(10) Patent No.: US 8,989,995 B2
(45) Date of Patent: Mar. 24, 2015

(54) ROW RUNNING CONTROL SYSTEM AND VEHICLE

(75) Inventor: Mitsuhisa Shida, Fuji (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 653 days.

(21) Appl. No.: 13/140,291

(22) PCT Filed: Jan. 20, 2009

(86) PCT No.: PCT/JP2009/050752
§ 371 (c)(1),
(2), (4) Date: Jun. 16, 2011

(87) PCT Pub. No.: WO2010/084568
PCT Pub. Date: Jul. 29, 2010

(65) Prior Publication Data
US 2011/0270513 A1    Nov. 3, 2011

(51) Int. Cl.
*G06F 17/00* (2006.01)
*G08G 1/16* (2006.01)
*B60W 30/165* (2012.01)
*G08G 1/00* (2006.01)

(52) U.S. Cl.
CPC ............ *G08G 1/161* (2013.01); *B60W 30/165* (2013.01); *G08G 1/22* (2013.01)
USPC .......................................... 701/117; 701/23

(58) Field of Classification Search
USPC ................................ 701/96, 116, 117, 23, 24
See application file for complete search history.

(56) References Cited

U.S. PATENT DOCUMENTS

| | | | | |
|---|---|---|---|---|
| 6,032,097 | A * | 2/2000 | Iihoshi et al. | 701/96 |
| 6,580,976 | B1 * | 6/2003 | Belcea | 701/20 |
| 2002/0059017 | A1 | 5/2002 | Yamane et al. | |
| 2004/0083037 | A1 | 4/2004 | Yamane et al. | |
| 2005/0256630 | A1 | 11/2005 | Nishira et al. | |
| 2006/0217866 | A1 * | 9/2006 | Moebus | 701/70 |

FOREIGN PATENT DOCUMENTS

| | | |
|---|---|---|
| EP | 1 696 403 A1 | 8/2006 |
| JP | A-10-162282 | 6/1998 |
| JP | A-11-339185 | 12/1999 |
| JP | A-2002-123894 | 4/2002 |
| JP | A-2003-123180 | 4/2003 |
| JP | A-2004-152125 | 5/2004 |

(Continued)

OTHER PUBLICATIONS

Jul. 27, 2012 Extended European Search Report issued in European Patent Application No. 09838760.8.

(Continued)

*Primary Examiner* — Khoi Tran
*Assistant Examiner* — Adam Mott
(74) *Attorney, Agent, or Firm* — Oliff PLC

(57) ABSTRACT

A row running control system is a system that controls the running state of each vehicle by optimum control (LQ control) so that five vehicles, for example, run in a row. Acceleration instruction values for the succeeding four vehicles among the five vehicles are determined as values minimizing predetermined evaluation functions, and the evaluation functions are calculated based on the errors of the distances between the respective vehicles, relative speeds between the respective vehicles and the acceleration instruction values for the respective vehicles.

8 Claims, 18 Drawing Sheets

(56) References Cited

FOREIGN PATENT DOCUMENTS

| JP | A-2004-287672 | | 10/2004 |
|---|---|---|---|
| JP | A-2005-324727 | | 11/2005 |
| JP | A-2006-232240 | | 9/2006 |
| JP | 2008204094 A | * | 9/2008 |
| JP | A-2008-204094 | | 9/2008 |

OTHER PUBLICATIONS

International Search Report issued in International Application No. PCT/JP2009/050752 dated Mar. 3, 2009.
International Preliminary Report on Patentability issued in Application No. PCT/JP2009/050752; Dated Sep. 29, 2011.

* cited by examiner

000
ROW RUNNING CONTROL SYSTEM AND VEHICLE

TECHNICAL FIELD

The present invention relates to a row running control system that controls running states of each constituent vehicle constituting a row so that a plurality of vehicles run in a row, and a vehicle including such a system.

BACKGROUND ART

Recently, in order to promote improvements in traffic flow and promote improvements in fuel efficiency through reductions in air resistance, a technology has received attention, which causes a plurality of vehicles to run in a row with a short inter-vehicle distance. In the related art, as a technology of the row running, a method is known in which the respective succeeding vehicles of the row control the inter-vehicle distance between the succeeding vehicle and the preceding vehicle, respectively. In this method, there is a problem in that, when the lead vehicle encounters a disturbance such as the road gradient or wind, an error in inter-vehicle distance is propagated to the rear vehicles. In regard to the problem, a system of a publication of Japanese Unexamined Patent Application Publication No. 10-162282 has been suggested. In this system, each of the succeeding vehicles of the row controls the inter-vehicle distance between itself and the lead vehicle of the row, whereby row running by a plurality of vehicles is realized. According to the method, since the respective succeeding vehicles respond rapidly to the disturbance encountered by the lead vehicle of the row, there is no propagation and the like of an error in inter-vehicle distance, and it is difficult for the behavior of the row to be disturbed.

CITATION LIST

Patent Literature

Japanese Unexamined Patent Application Publication No. 10-162282

SUMMARY OF INVENTION

Technical Problem

However, in the system of the above Patent Citation, when any one of the succeeding vehicles other than the lead vehicle encounters the disturbance, since it is almost completely unable to cope with the disturbance, the behavior of the row easily becomes confused and unstable. Furthermore, since the inter-vehicle distances between the succeeding vehicles are not controlled, even when the succeeding vehicles unnecessarily approach each other, an action of trying to restore the approach is not performed and the behavior of the row is unstable. In this manner, there is a problem in that the row running by the system described in the above Patent Citation is relatively weak in terms of a disturbance.

Thus, an object of the present invention is to provide a row running control system that is capable of realizing a row running resistant to disturbances, and a vehicle.

Solution to Problem

According to the present invention, there is provided a row running control system that controls running states of each vehicle so that a plurality of vehicles runs in a row, wherein running control amount of at least a part of constituent vehicles of constituent vehicles constituting the row is determined as a running control amount which minimizes a predetermined evaluation value, and wherein the predetermined evaluation value is calculated based on a value concerning a relative relationship between the respective constituent vehicles, and a value concerning a running control amount of at least one constituent vehicle of the constituent vehicles.

According to the row running control system, since the row running is controlled in view of the relative relationships between the constituent vehicles of the row and the running control amounts of the constituent vehicles, it is possible to realize row running resistant to disturbances that disturbs the relative relationships between the respective constituent vehicles.

Furthermore, the predetermined evaluation value may be a value that is calculated by performing a weighting on each of the values concerning the relative relationship between the respective constituent vehicles and the value concerning the running control amount of at least one constituent vehicle of the constituent vehicles.

In this case, it is possible to perform the weighting on an influence in which the value concerning the relative relationship between the respective constituent vehicles and the value concerning the running control amount of at least one constituent vehicle of the constituent vehicles have an effect on the control of the row running, respectively.

Furthermore, the value concerning the relative relationship between the constituent vehicles may include at least one of errors of respective inter-vehicle distances between the vehicle and immediately preceding constituent vehicle in the respective constituent vehicles or respective relative speeds between the vehicle and immediately preceding constituent vehicle in the respective constituent vehicles.

In this case, since the inter-vehicle distances or the relative speeds of the constituent vehicles are considered, it is possible to realize row running resistant to disturbances that disturb the inter-vehicle distances or the relative speeds of the respective constituent vehicles and having a high inter-vehicle stability.

Furthermore, at least a part of the constituent vehicles may include a lead vehicle in the row. According to the configuration, the running state of the lead vehicle is also controlled, whereby the disturbance can also be absorbed by the movement of the lead vehicle.

Furthermore, in this case, the value concerning the running control amount of at least one constituent vehicle may be a value that is calculated by performing a weighting on each of the running control amount of the lead vehicle and the running control amounts of the succeeding vehicles other than the lead vehicle, and weights in the weighting may be determined based on the positional relationship between the lead vehicle and an obstruction that exists ahead of the lead vehicle.

The inventors took note that, when the running state of the lead vehicle is controlled, since it can be considered that the stability of the lead vehicle is low in a case where the positional relationship between the lead vehicle and the obstruction is unsatisfactory (for example, a case where the lead vehicle is close to the obstruction), there is a need to moderate the extent to which the control intervenes in the lead vehicle. In view of this knowledge, according to the above configuration of the row running control system, weights in the weighting are determined based on the positional relationship between the lead vehicle and the obstruction in the evaluation value, and a balance between the extent of the control intervention to the lead vehicle and the extent of the control intervention to the succeeding vehicle is obtained by the weighting. Thus, it is possible to cause the control to intervene in the lead vehicle with a balance depending on the stability of the lead vehicle. As a consequence, for example, when the distance between the lead vehicle and the obstruction is close, it is possible to avoid a demand for a significant behavior in the lead vehicle.

Furthermore, the predetermined evaluation value may be a value that is calculated by performing a weighting on each of errors of the respective inter-vehicle distances between the vehicle and immediately preceding vehicle in the respective constituent vehicles and the running control amount of at least one constituent vehicle of the constituent vehicles, and the weights in the weighting may be determined based on the running speed of the constituent vehicle.

The inventors took notice that, in order to promote an improvement in fuel efficiency in the row running of this kind of vehicle, when the vehicle runs at a low speed, since the influence of air resistance is small, a reduction in acceleration and deceleration of the constituent vehicle needs to be considered to be more important than the stability of the row, and conversely, when the vehicle runs at a high speed, since the influence of air resistance is large, the stability of the row needs to be considered to be more important than a reduction in acceleration and deceleration of the constituent vehicle. In view of this knowledge, according to the above configuration of the row running control system, the weights in the weighting are determined based on the running speed of the constituent vehicle in the evaluation value, and a balance is obtained between the relative relationship between the vehicles of the constituent vehicles of the row concerning the stability of the row and the running control amount of the constituent vehicle concerning the suppression of the acceleration and the deceleration of the constituent vehicle. Thus, according to the system, it is possible to perform the row running control including the stability of the row and the suppression of the acceleration and the deceleration of the constituent vehicles in consideration of the balance based on the running speed of the row, thereby effectively promoting an improvement in fuel efficiency.

The vehicle of the present invention includes any one of the row running control systems. Since the vehicle includes any one of the row running control systems, a row running resistant to disturbances can be realized. Furthermore, in this case, the vehicle of the present invention may be one constituent vehicle of the row.

Advantageous Effects of Invention

According to the row running control system and the vehicle of the present invention, it is possible to realize row running resistant to disturbances.

BRIEF DESCRIPTION OF DRAWINGS

FIG. 8D is a diagram that shows a model of the row running control according to the first past control.

FIG. 9D is a diagram that shows a model of the row running control according to the first past control.

1, 201, 301, 401 and 501 . . . row running control system $C_1$ to $C_5$ . . . vehicle $C_1$ . . . lead vehicle $C_2$ to $C_5$ . . . succeeding vehicles

DESCRIPTION OF EMBODIMENTS

Hereinafter, preferred embodiments of a row running control system and a vehicle according to the present invention will be described in detail with reference to the accompanying drawings.

First Embodiment

Figure 1:
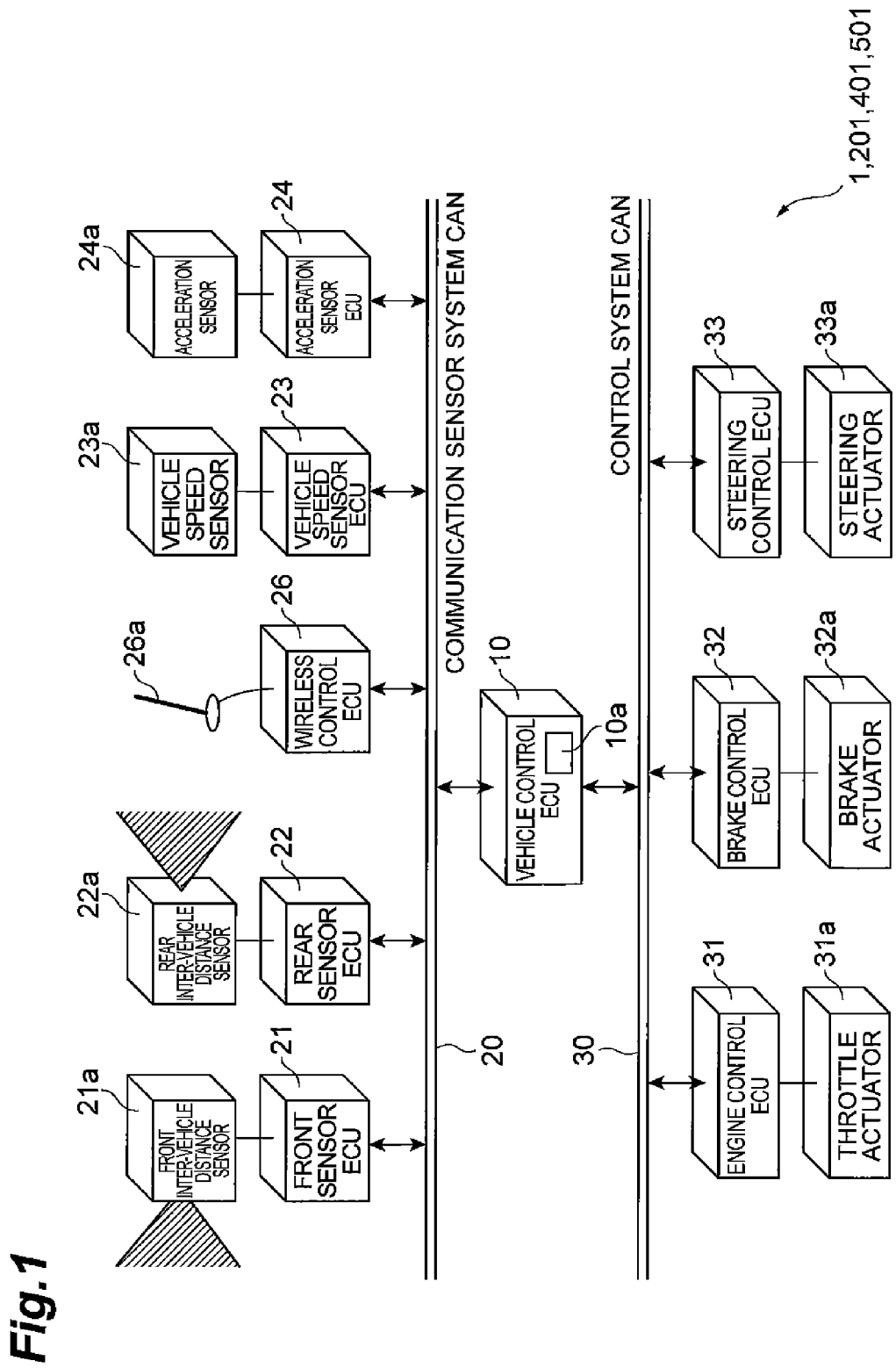
FIG. 1 is a block diagram that shows first, second, fourth and fifth embodiments of a row running control system according to the present invention.

A row running control system 1 shown in FIG. 1 is a system that controls the respective running states of a plurality of vehicles so that the plurality of vehicles can run in a row. By means of the row running control system 1, a row running is realized in which a plurality of vehicles run while being arranged longitudinally in a row at relatively narrow inter-vehicle distances. In the row running control system 1, although row running constituted by any arbitrary number of vehicles can be realized, herein, as shown in FIG. 2, a case will be described as an example where the row running is performed by five vehicles $C_1$, $C_2$, $C_3$, $C_4$ and $C_5$.

Figure 2:
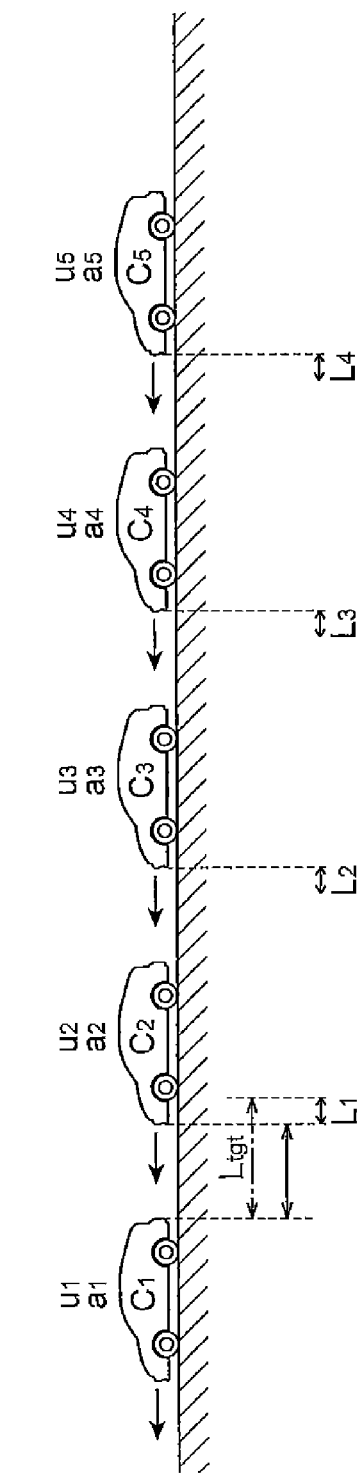
FIG. 2 is a diagram that shows a row running which is realized by the row running control system shown in FIG. 1.

In addition, in the following description, as shown in FIG. 2, the acceleration of nth (n=1, 2, . . . , 5) vehicle $C_n$ counted from the lead of the row is represented by "$a_n$", the velocity of the vehicle $C_n$ is represented by "$V_n$", and an acceleration instruction value of the vehicle $C_n$ is represented by "$u_n$". Furthermore, an inter-vehicle error between the vehicle $C_n$ and the vehicle $C_{n+1}$ is represented by "$L_n$". In addition, the inter-vehicle error refers to an error between a target inter-vehicle distance $L_{tgt}$ and the current inter-vehicle distance. Furthermore, in some cases, among the constituent vehicles $C_1$ to $C_5$ of the row, a vehicle $C_1$ running in the lead is called "the lead vehicle", and in contrast to this, the vehicles $C_2$ to $C_5$ are collectively called "succeeding vehicles".

All the vehicles $C_1$ to $C_5$ constituting the row each have one row running control system 1 described below installed thereon, respectively.

As shown in FIG. 1, the row running control system 1 includes a vehicle control ECU (Electronic Control Unit) 10. The vehicle control ECU 10 is an electronic control unit that performs the control of the overall row running control system 1, and is, for example, constituted by a computer including a CPU, a ROM and a RAM as a main body. The vehicle control ECU 10 has an information memory portion 10a capable of preserving information temporarily or in the long term. In addition, the vehicle control ECU 10 functions as calculation means that computes the respective acceleration instruction values $u_1$ to $u_5$ of the vehicles $C_1$ to $C_5$ by means of a predetermined calculation described below.

Moreover, the row running control system 1 includes a sensor group for detecting the running state of the vehicle. The sensor group includes a front inter-vehicle distance sensor 21a, a rear inter-vehicle distance sensor 22a, a vehicle speed sensor 23a, and an acceleration sensor 24a.

The front inter-vehicle distance sensor 21a can detect an inter-vehicle distance between a subject vehicle and a vehicle running just before the vehicle. Similarly, the rear inter-vehicle distance sensor 22a can detect an inter-vehicle distance between the subject vehicle and a vehicle running just after the vehicle. As the front inter-vehicle distance sensor 21a and the rear inter-vehicle distance sensor 22a, for example, millimeter wave radar is adopted which are provided at a front portion and a rear portion of the vehicle, respectively. A signal obtained by the front inter-vehicle distance sensor 21a is processed by the front sensor ECU 21 and is transmitted to the vehicle control ECU 10 as front inter-vehicle distance information. Similarly, a signal obtained by the rear inter-vehicle distance sensor 22a is processed by the rear sensor ECU 22 and is transmitted to the vehicle control ECU 10 as rear inter-vehicle distance information.

The vehicle speed sensor 23a is capable of detecting the speed of the subject vehicle. As the vehicle speed sensor 23a, for example, an electromagnetic pickup sensor for detecting a vehicle wheel speed may be used. A signal obtained by the vehicle speed sensor 23a is processed by the vehicle speed sensor ECU 23 and is transmitted to the vehicle control ECU 10 as the vehicle speed information. As the acceleration sensor 24a, for example, a gas rate sensor or a gyro sensor is used. A signal obtained by the acceleration sensor 24a is processed by the acceleration sensor ECU 24 and is transmitted to the vehicle control ECU 10 as the acceleration information.

In addition, the front sensor ECU 21, the rear sensor ECU 22, the vehicle speed sensor ECU 23, and the acceleration sensor ECU 24 are connected to the vehicle control ECU 10 via a communication sensor system CAN 20 that is built as a network in the vehicle.

As mentioned above, in the row running control system 1, it is possible to obtain the front inter-vehicle distance information, the rear inter-vehicle distance information, the vehicle speed information, and the acceleration information of the subject vehicle by means of the aforementioned sensor group. In addition, in the following description, in some cases, the front inter-vehicle distance information, the rear inter-vehicle distance information, the vehicle speed information, and the acceleration information are collectively called "running state information".

Furthermore, the system 1 includes an engine control ECU 31, a brake control ECU 32, a steering control ECU 33 so that an operation such as deceleration, acceleration, and the steering of the subject vehicle can be performed. The engine control ECU 31 receives the acceleration instruction value information to be transmitted from the vehicle control ECU 10, and operates a throttle actuator 31a or the like by an operation amount corresponding to the acceleration instruction value. Furthermore, the brake control ECU 32 receives the acceleration instruction value information, and operates the brake actuator 32a or the like by an operation amount corresponding to the acceleration instruction value. Moreover, the steering control ECU 33 receives the steering instruction value information to be transmitted from the vehicle control ECU 10, and operates the steering actuator 33a or the like by an operation amount corresponding to the steering instruction value.

Moreover, the row running control system 1 includes a wireless antenna 26a and a wireless control ECU 26 so that mutual running state information and the like can be exchanged between the subject vehicle and other constituent vehicles of the row. The respective vehicles $C_1$ to $C_5$ in the row perform inter-vehicle communication by the wireless antenna 26a and the wireless control ECU 26 to acquire vehicle specification information, running state information, and acceleration instruction value information of all other constituent vehicles, and transmits the vehicle specification information, the running state information, and the acceleration instruction value information of the subject to other vehicles. In the vehicle control ECU 10 of all the vehicles $C_1$ to $C_5$, the vehicle specification information, the running state information, and the acceleration instruction value information of all the vehicles $C_1$ to $C_5$ can be shared by means of such inter-vehicle communication. In addition, the wireless control ECU 26 is connected to the vehicle control ECU 10 via the aforementioned communication sensor system CAN 20.

Next, the row running control according to the row running control system 1 will be described.

In the row running control according to the row running control system 1, the running states of four succeeding vehicles $C_2$ to $C_5$ are controlled depending on the running state of the lead vehicle $C_1$. That is, the lead vehicle $C_1$ is manually driven by a driver, and the control of the row running control system 1 does not intervene in the running state of the lead vehicle $C_1$. Moreover, the row running control system 1 controls the running states of the four succeeding vehicles $C_2$ to $C_5$ so as to follow the lead vehicle $C_1$ which is manually driven by a driver.

According to the row running control system 1, when determining the respective acceleration instruction values $u_2$ to $u_5$ of the respective succeeding vehicles $C_2$ to $C_5$, the running state information and the like of all the vehicles $C_1$ to $C_5$ is used. Specifically, in the row running control system 1, an optimum control (LQ control) is used and the acceleration instruction values $u_2$ to $u_5$ are determined by the use of accelerations $a_1$ to $a_5$, inter-vehicle errors $L_1$ to $L_4$, inter-vehicle relative speeds $L'_1$ to $L'_4$, and acceleration instruction values $u_1$ to $u_5$ of all the vehicles $C_1$ to $C_5$ constituting the row. In addition, although the inter-vehicle relative speed is a difference between a vehicle speed $V_n$ of a vehicle $C_n$ and a vehicle speed $V_{n+1}$ of a vehicle $C_{n+1}$, since a time differentiation of an inter-vehicle error $L_n$ exists, the inter-vehicle relative speed is represented by $dL_n/dt$ or $L'_n$.

Herein, an algorithm will be described in which the row running control system 1 determines the acceleration instruction values $u_2$ to $u_5$ of the respective succeeding vehicles $C_2$ to $C_5$.

In the row running control, by setting the acceleration instruction values $u_2$ to $u_5$ as control inputs, and setting the accelerations $a_1$ to $a_5$, the inter-vehicle errors $L_1$ to $L_4$, and the inter-vehicle relative speeds $L'_1$ to $L'_4$ as state amounts, the row running of the vehicles $C_1$ to $C_5$, is represented by state space equation (1) as below. Moreover, the optimal control (LQ control) is applied to the system represented by the state space equation (1).

[Equation 1]

$$x = Ax + B_c u_c + B_o u_o + B_w u_w \qquad (1)$$

However, x: state vector, $x = (a_1, L_1, L'_1, a_2, L_2, L'_2, a_3, L_3, L'_3, a_4, L_4, L'_4, a_5)^T$ $u_c$: acceleration instruction value vector, $u_c = (u_2, u_3, u_4, u_5)^T$ $u_o$: acceleration instruction value of lead vehicle $u_w$: disturbances such as road gradient or wind Furthermore, A, $B_c$, $B_o$ and $B_w$ in equation (1) are matrices that are suitably determined based on conditions, such as vehicle specification information and the like of the vehicles $C_1$ to $C_5$. In addition, dots (points) over the characters such as x in the equation (1) represents the time differentiation, but they are represented by x' or the like instead of the dot in the texture. Furthermore, in the equation, the characters representing the matrix and the vector are indicated by bold characters, but, the bold character indications are omitted and ordinary characters are represented in the text.

At this time, the acceleration instruction value vector $u_c$ is represented in equation (2) as below using a feedback gain matrix K.

[Equation 2]

$$u_c = B_{ff} u_o + K_x \qquad (2)$$

However, $$B_{ff} = \begin{bmatrix} 1 \\ 1 \\ 1 \\ 1 \end{bmatrix}$$

Herein, the feedback gain matrix K is a matrix of 13 columns×4 rows.

Moreover, an evaluation function J for performing an optimal control (LQ control) of the system represented in the state space equation (1) is defined as equation (3).

[Equation 3]

$$J = \int \left\{ \varepsilon_L (L_1^2 + L_2^2 + L_3^2 + L_4^2) + \varepsilon_{dL} \left( \frac{dL_1^2}{dt} + \frac{dL_2^2}{dt} + \frac{dL_3^2}{dt} + \frac{dL_4^2}{dt} \right) + \varepsilon_u (u_2^2 + u_3^2 + u_4^2 + u_5^2) \right\} dt \qquad (3)$$

In the equation (3), weights $\varepsilon_L$, $\varepsilon_{dL}$, $\varepsilon_u$ of the weighting are set in a term set in consideration of the inter-vehicle errors $L_1$ to $L_4$, a term set in consideration of the inter-vehicle relative speeds $L'_1$ to $L'_4$, and a term set in consideration of the acceleration instruction values $u_2$ to $u_5$, respectively. That is, by distributing weights $\varepsilon_L$, $\varepsilon_{dL}$, $\varepsilon_u$ included in the evaluation function by J, a balance of the importance in the row running control of the three elements is determined which includes the stability of the inter-vehicle distance, a reduction in inter-vehicle relative speed, and a reduction (energy conservation of the acceleration and the deceleration) in acceleration and deceleration of the vehicle. Thus, by adjusting the weights $\varepsilon_L$, $\varepsilon_{dL}$, $\varepsilon_u$, it is possible to carry out the row running control in which the three elements are considered important by a desired distribution. In addition, the values of the weights $\varepsilon_L$, $\varepsilon_{dL}$, $\varepsilon_u$ are determined in advance by the designer of the row running control system 1 based on the desired design idea and are stored in the information memory portion 10a of the vehicle control ECU 10 in advance.

The feedback gain matrix $K_1$, which minimizes the evaluation function J of the equation (3), is uniquely obtained when a group of the five vehicles $C_1$ to $C_5$ constituting the row are decided. Moreover, the obtained feedback gain matrix $K_1$ is applied to the equation (2). Moreover, in the equation (2) to which the feedback gain matrix $K_1$ is applied, $u_1$ of the lead vehicle is set to feed forward, and the state vector x obtained based on information from each sensor groups is substituted, whereby the acceleration instruction value vector $u_c$ is obtained which minimizes the evaluation function J. That is, a group of the acceleration instruction values $u_2$ to $u_5$ is obtained which minimizes the evaluation function J.

Specifically, when representing 13×4 elements included in the feedback gain matrix $K_1$ by adding indexes to "k", the acceleration instruction values $u_2$ to $u_5$ are obtained by equation 4 as below.

[Equation 4]

$$u_n = u_1 + \left(k_{a_1 n} \cdot a_1 + k_{L_2 n} \cdot L_1 + k_{dL_1 n} \cdot \frac{dL_1}{dt}\right) + \quad (4)$$
$$\left(k_{a_2 n} \cdot a_2 + k_{L_3 n} \cdot L_2 + k_{dL_2 n} \cdot \frac{dL_2}{dt}\right) +$$
$$\left(k_{a_3 n} \cdot a_3 + k_{L_3 n} \cdot L_3 + k_{dL_3 n} \cdot \frac{dL_3}{dt}\right) +$$
$$\left(k_{a_4 n} \cdot a_4 + k_{L_4 n} \cdot L_4 + k_{dL_4 n} \cdot \frac{dL_4}{dt}\right) + k_{a_5 n} \cdot a_5$$

In addition, the state vector x used in the row running control can be obtained based on information from the respective sensor groups of the respective vehicles $C_1$ to $C_5$. That is, the accelerations $a_1$ to $a_5$ of the state vector x can be obtained based on the respective acceleration information that can be obtained from the acceleration sensor 24a of the respective vehicles $C_1$ to $C_5$. Furthermore, the inter-vehicle errors $L_1$ to $L_4$, can be obtained based on the respective inter-vehicle distance information that can be obtained from the front inter-vehicle distance sensor 21a or the rear inter-vehicle distance sensor 22a of the respective vehicles $C_1$ to $C_5$. Moreover, the inter-vehicle relative speeds $L'_1$ to $L'_4$ can be obtained by calculating the difference between the vehicle speeds of the front and rear vehicles based on the respective vehicle speed information that can be obtained from the vehicle speed sensor 23a of the respective vehicles $C_1$ to $C_5$. In addition, the accelerations $a_1$ to $a_5$, the inter-vehicle errors $L_1$ to $L_4$, and the inter-vehicle relative speeds $L'_1$ to $L'_4$ may be obtained by other methods. For example, the inter-vehicle relative speeds $L'_1$ to $L'_4$ may be obtained based on variation rates of the inter-vehicle errors $L_1$ to $L_4$, respectively.

Next, the specific process to be performed by the row running control system 1 of the respective vehicles $C_1$ to $C_5$ based on the algorithm will be described with reference to the flow chart. The vehicle control ECU 10 of the row running control system 1 of all the vehicles $C_1$ to $C_5$ performs the process described below in parallel, respectively.

Firstly, at the point of time when the constituent vehicles $C_1$ to $C_5$ constituting the row are determined, the process performed by the vehicle control ECU 10 of the respective vehicles $C_1$ to $C_5$ will be described based on FIG. 3.

Figure 3:
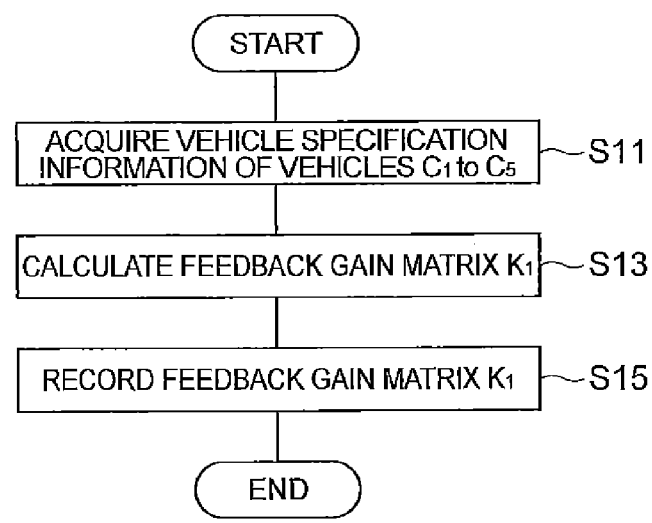
FIG. 3 is a flow chart that shows the process which is performed by the row running control system of the first embodiment at the point of time when constituent vehicles of the row are determined.

As shown in FIG. 3, when the vehicles $C_1$ to $C_5$ constituting the row are determined, the vehicle control ECU 10 acquires the vehicle specification information of all other constituent vehicles by means of the inter-vehicle communication through the wireless control 26a and the wireless control ECU 26. Furthermore, by reading the vehicle specification information of the subject vehicle that is recorded in the information memory portion 10a, the vehicle specification information of all the vehicles $C_1$ to $C_5$ (S11) is acquired. The vehicle specification information includes acceleration response properties, or the like, of the respective vehicles. Next, the vehicle control ECU 10 creates the state space equation of equation (1) and the evaluation function of the equation (3) based on the acquired vehicle specification information of all the vehicles $C_1$ to $C_5$, and calculates the feedback gain matrix $K_1$ that minimizes the evaluation function J (S13). Moreover, the vehicle control ECU 10 records the calculated feedback gain matrix $K_1$ on the information memory portion 10a (S15).

Next, the process performed by the vehicle control ECU 10 of the respective vehicles $C_1$ to $C_5$ during row running will be described with reference to FIG. 4.

Figure 4:
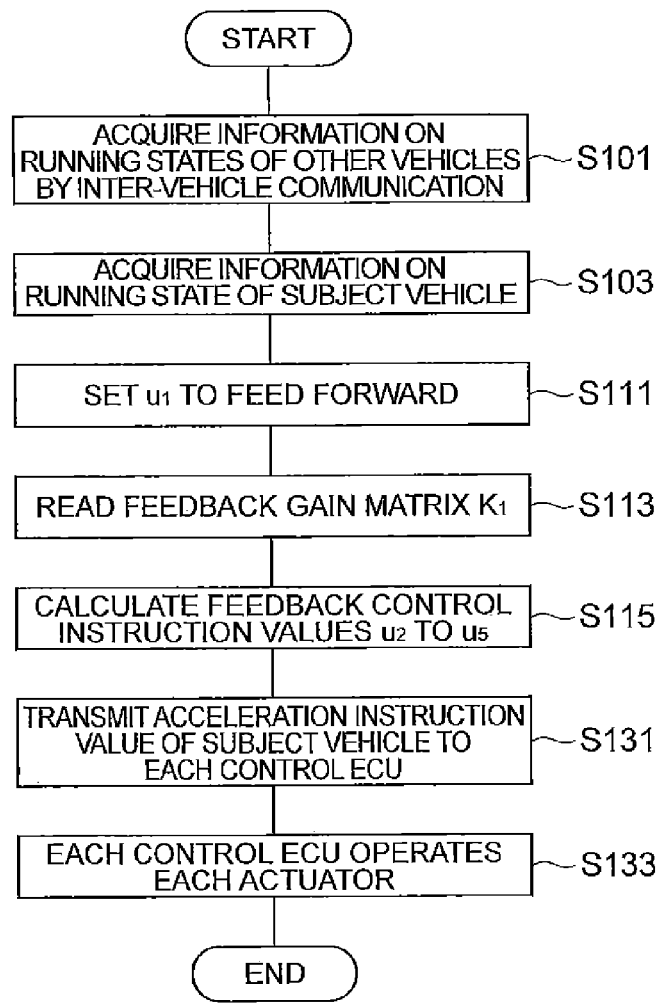
FIG. 4 is a flow chart that shows the process which is performed by the row running control system of the first embodiment during row running.

As shown in FIG. 4, the vehicle control ECU 10 acquires the front inter-vehicle distances, the rear inter-vehicle distances, the vehicle speeds, and the accelerations of the four other vehicles by means of the inter-vehicle communication (S101). Next, the front inter-vehicle distance, the rear inter-vehicle distance, the vehicle speed, and the acceleration of the subject vehicle are acquired from the sensor groups 21a to 24a of the subject vehicle (S103). By means of the process, the vehicle control ECU 10 acquires the front inter-vehicle distances, the rear inter-vehicle distances, the vehicle speeds, and the accelerations of all the vehicles $C_1$ to $C_5$, calculates the accelerations $a_1$ to $a_5$, the inter-vehicle errors $L_1$ to $L_4$, and the inter-vehicle relative speeds $L'_1$ to $L'_4$ based on the acquired information, and can obtain the state vector x.

Next, in the above equation (2), the acceleration instruction value $u_1$ of the lead vehicle $C_1$ is set to feed forward (S111), and the feedback gain matrix $K_1$ is read from the information memory portion 10a (S113). Moreover, the acceleration instruction value vector $u_c$ is calculated from the equation (2) based on the acceleration instruction value $u_1$ and the state vector x using the feedback gain matrix $K_1$. That is, the group of the feedback control instruction values $u_2$ to $u_5$ is obtained (S115).

Then, the vehicle control ECU 10 of the vehicles $C_2$ to $C_5$ transmits an acceleration instruction value $u_n$ (for example, the acceleration instruction value $u_3$ if the subject vehicle is the vehicle $C_3$, and the acceleration instruction value $u_4$ if the subject vehicle is the vehicle $C_4$) of the subject vehicle among the calculated acceleration instruction values $u_2$ to $u_5$ to the engine control ECU 31 and the brake control ECU 32 (S131). Moreover, the engine control ECU 31 operates the throttle actuator 31a based on the received acceleration instruction value $u_n$, and the brake control ECU 32 operates the brake actuator 32a based on the received acceleration instruction value $u_n$ (S133). The processes of S101 to S133 of FIG. 4 as above are repeated during row running. By means of the processes, the decelerations and the accelerations of the four succeeding vehicles $C_2$ to $C_5$ are controlled to correspond to the lead vehicle $C_1$, whereby the row running of the five vehicles $C_1$ to $C_5$ is accomplished.

As described above, the row running control system 1 to be mounted on the respective vehicles $C_1$ to $C_5$ acquires the accelerations $a_1$ to $a_5$, the inter-vehicle errors $L_1$ to $L_4$, and the inter-vehicle relative speeds $L'_1$ to $L'_4$ concerning all the vehicles $C_1$ to $C_5$ in the row. Moreover, a group of the acceleration instruction values $u_2$ to $u_5$ of all the succeeding vehicles $C_2$ to $C_5$ is determined by the LQ control using the state vector x that includes the acquired accelerations $a_1$ to $a_5$, the inter-vehicle errors $L_1$ to $L_4$, and the inter-vehicle relative speeds $L'_1$ to $L'_4$ as elements thereof. Moreover, the row running control system 1 of the respective succeeding vehicles $C_2$ to $C_5$ adopts the acceleration instruction value $u_n$ concerning the subject vehicle $C_n$ among the determined acceleration instruction values $u_2$ to $u_5$, and the engine control ECU 31 and the brake control ECU 32 operate the throttle actuator 31a and the brake actuator 32a based on the acceleration instruction value $u_n$.

In this manner, according to the row running control system 1, the row running is controlled in view of the accelerations $a_1$ to $a_5$ of the vehicles $C_1$ to $C_5$, the inter-vehicle errors $L_1$ to $L_4$ between the vehicles $C_1$ to $C_5$, the inter-vehicle relative speeds $L'_1$ to $L'_4$ between the vehicles $C_1$ to $C_5$, and the acceleration instruction values $u_2$ to $u_5$ of the vehicles $C_2$ to $C_5$. Thus, even in a case where any one of the vehicles $C_1$ to $C_5$ encounters a disturbance during row running, the four succeeding vehicles $C_2$ to $C_5$ are moved in unison to stabilize the distance between the vehicles, thereby smoothly causing the error between the vehicles to converge. Thus, according to the row running control system 1, it is possible to realize row running resistant to a disturbance that disturbs the inter-vehicle distance or the inter-vehicle relative speed between the vehicles of the respective vehicles $C_1$ to $C_5$.

Furthermore, in the evaluation function J, a designer sets the weights $\epsilon_L, \epsilon_{dL}, \epsilon_u$ to be divided into each of a term set in consideration of the inter-vehicle errors $L_1$ to $L_4$, a term set in consideration of the inter-vehicle relative speeds $L'_1$ to $L'_4$, and a term set in consideration of the acceleration instruction values $u_2$ to $u_5$, whereby it is possible to realize row running control in which factors of the stability of the inter-vehicle distance, a reduction in relative speed between the vehicles, and energy conservation of the acceleration and the deceleration are weighted by degree of importance of a desired distribution.

Next, the description will be given of the results of simulations performed by the inventors so that the disturbance stability of the running states of the vehicles $C_1$ to $C_5$ according to the row running control system 1 can be evaluated, based on FIGS. 5 to 10.

The inventors obtained the inter-vehicle errors $L_1$ to $L_4$, and the inter-vehicle relative speeds $L'_1$ to $L'_4$, and the accelerations $a_1$ to $a_5$, in a case where a predetermined disturbance is added to the row, in the row running control of the vehicles $C_1$ to $C_5$ according to the row running control system 1, through the simulation. Furthermore, the inventors also performed the same simulation on row running according to two types of two controls of the related art as a comparison target. The two types of controls of the related art included a row running control (see FIG. 5D; hereinafter, referred to as "first past control") using a model in which the vehicles $C_1$ to $C_5$ were joined by a spring damper shock absorbing unit in series, and a row running control (see FIG. 6D: hereinafter, referred to as "second past control") using a model in which the respective succeeding vehicles $C_2$ to $C_5$ were arranged in parallel and were joined to the vehicle $C_1$ by the spring damper shock absorbing unit. As shown in FIGS. 5D and 6D, the spring damper shock absorbing units of this model are units in which a spring k is joined to a damper c in parallel.

FIG. 5 shows the inter-vehicle errors $L_1$ to $L_4$ (FIG. 5A), the inter-vehicle relative speeds $L'_1$ to $L'_4$ (FIG. 5B), and the accelerations $a_1$ to $a_5$ (FIG. 5C) of the respective vehicles $C_1$ to $C_5$ in a case where the row entered an unknown road gradient of 1 deg during normal running at 15 km/h in the first past control.

Furthermore, FIG. 6 shows the inter-vehicle errors $L_1$ to $L_4$ (FIG. 6A), the inter-vehicle relative speeds $L'_1$ to $L'_4$ (FIG. 6B), and the accelerations $a_1$ to $a_5$ (FIG. 6C) of the respective vehicles $C_1$ to $C_5$ in a case where the row entered an unknown road gradient under the same conditions as above in the second past control.

Figure 7A:
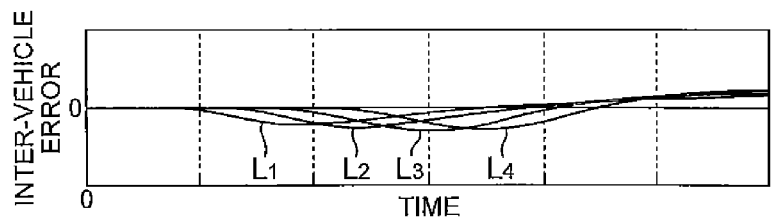
FIGS. 7A to 7C are graphs that show an inter-vehicle error, an inter-vehicle relative speed, and acceleration of each of vehicles $C_1$ to $C_5$ when an unknown gradient disturbance is given to the row running according to a row running control system of a first embodiment, respectively.
Figure 7B:
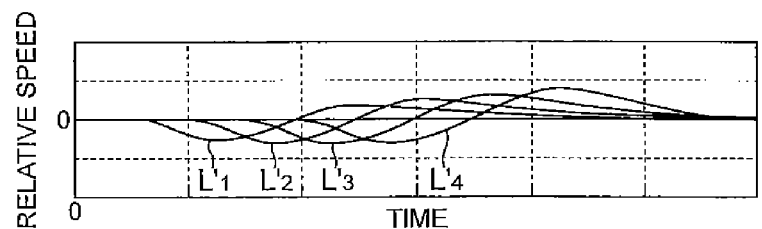
Figure 7C:
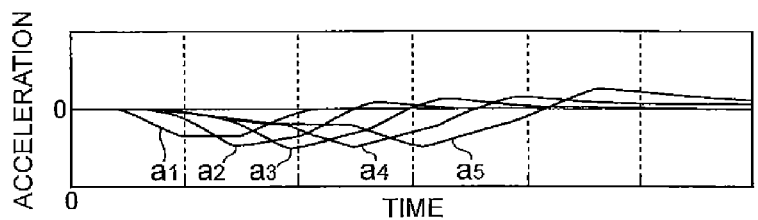

In contrast to this, FIG. 7 shows the inter-vehicle errors $L_1$ to $L_4$ (FIG. 7A), the inter-vehicle relative speeds $L'_1$ to $L'_4$ (FIG. 7B), and the accelerations $a_1$ to $a_5$ (FIG. 7C) of the respective vehicles $C_1$ to $C_5$ in a case where the row entered an unknown road gradient under the same condition as above, in the row running control according to the row running control system 1.

Figure 8A:
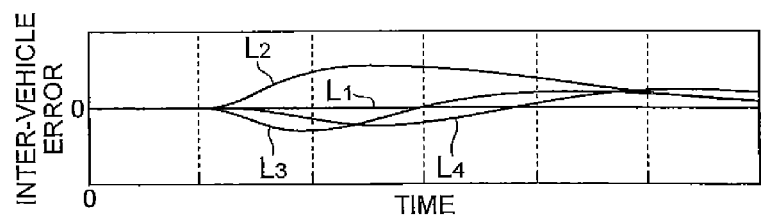
FIGS. 8A to 8C are graphs that show an inter-vehicle error, an inter-vehicle relative speed, and acceleration of each of vehicles $C_1$ to $C_5$ when an impulse-like disturbance is given to the row running according to a first past control, respectively.
Figure 8B:
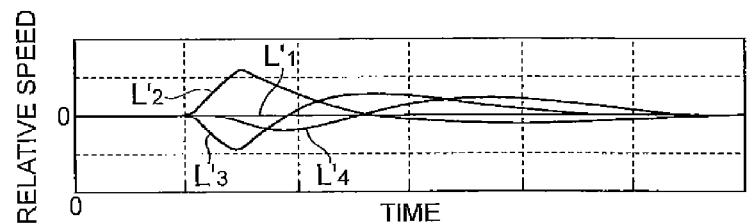
Figure 8C:
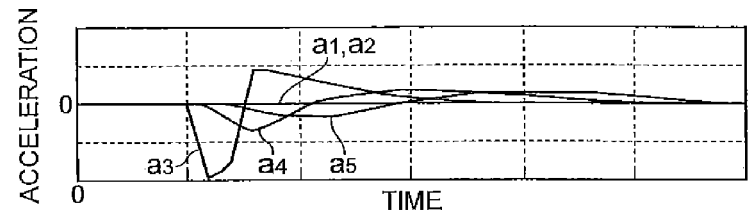

Furthermore, FIG. 8 shows the inter-vehicle errors $L_1$ to $L_4$ (FIG. 8A), the inter-vehicle relative speeds $L'_1$ to $L'_4$ (FIG. 8B), and the accelerations $a_1$ to $a_5$ (FIG. 8C) of the respective vehicles $C_1$ to $C_5$ in a case where an impulse-like disturbance of 0.1 G was applied to the vehicle $C_3$ while the row normally ran at 100 km/h, in the first past control.

Figure 9A:
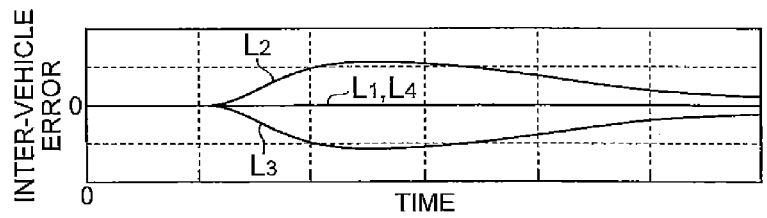
FIGS. 9A to 9C are graphs that show an inter-vehicle error, an inter-vehicle relative speed, and acceleration of each of vehicles $C_1$ to $C_5$ when an impulse-like disturbance is given to the row running according to a first past control, respectively.
Figure 9B:
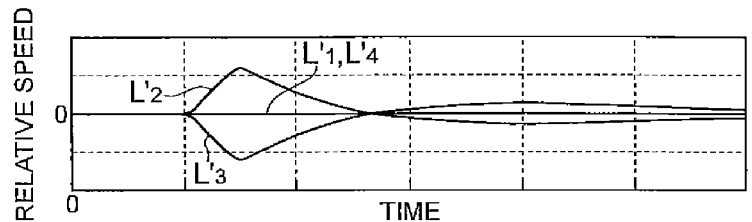
Figure 9C:
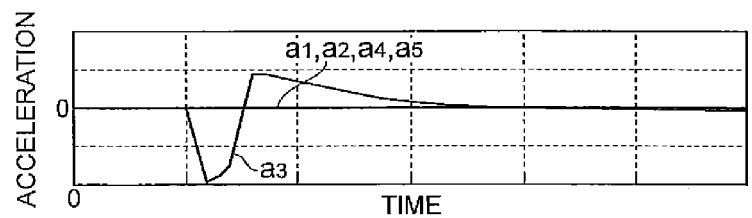

Moreover, FIG. 9 shows the inter-vehicle errors $L_1$ to $L_4$ (FIG. 9A), the inter-vehicle relative speeds $L'_1$ to $L'_4$ (FIG. 9B), and the accelerations $a_1$ to $a_5$ (FIG. 9C) of the respective vehicles $C_1$ to $C_5$ in a case where an impulse-like disturbance was applied under the same condition as above, in the second past control.

Figure 10A:
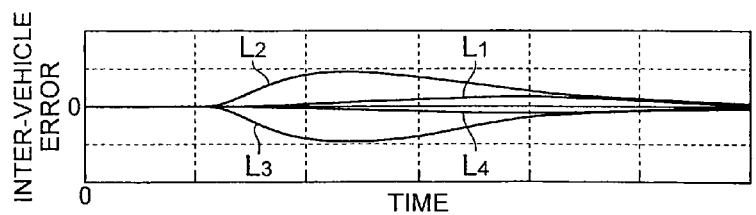
FIGS. 10A to 10C are graphs that show an inter-vehicle error, an inter-vehicle relative speed, and acceleration of each of vehicles $C_1$ to $C_5$ when an impulse-like disturbance is given to the row running according to a row running control system of a first embodiment, respectively.
Figure 10B:
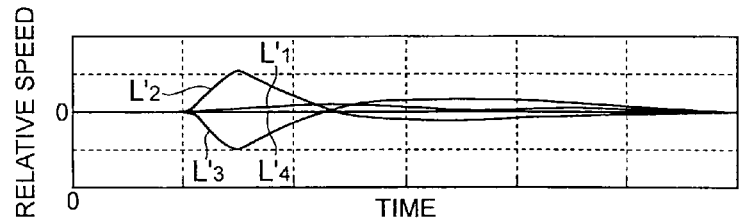
Figure 10C:
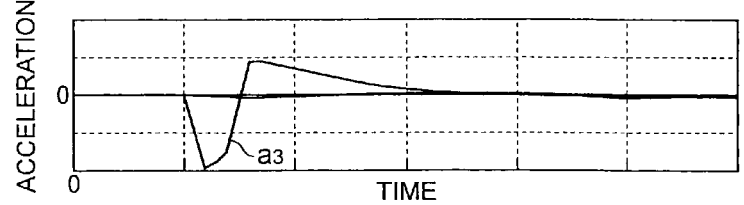

In contrast to this, FIG. 10 shows the inter-vehicle errors $L_1$ to $L_4$ (FIG. 10A), the inter-vehicle relative speeds $L'_1$ to $L'_4$ (FIG. 10B), and the accelerations $a_1$ to $a_5$ (FIG. 10C) of the respective vehicles $C_1$ to $C_5$ in a case where an impulse-like disturbance was applied under the same condition as above, in the row running control according to the row running control system 1.

In addition, the scales of the longitudinal axes of FIGS. 5A, 6A, 7A, 8A, 9A and 10A show the inter-vehicle errors $L_1$ to $L_4$ are all the same, the scales of the longitudinal axes of FIGS. 5B, 6B, 7B, 8B, 9B and 10B show the inter-vehicle relative speeds $L'_1$ to $L'_4$ are all the same, and the scales of the longitudinal axes of FIGS. 5C, 6C, 7C, 8C, 9C and 10C show the accelerations $a_1$ to $a_5$ are all the same. Furthermore, the scales of the horizontal axes of each drawing showing the time are held in common.

Hereinafter, the simulation result will be considered while comparing FIGS. 5 to 10.

Figure 5A:
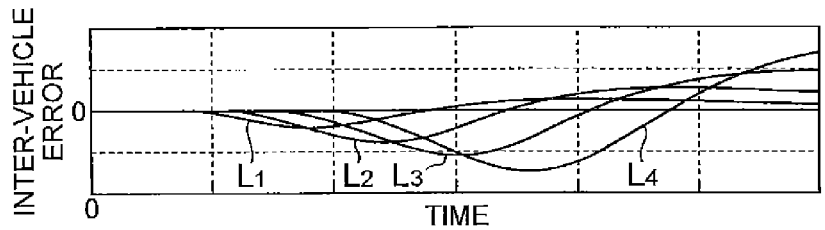
FIGS. 5A to 5C are graphs that show an inter-vehicle error, an inter-vehicle relative speed, and acceleration of each of vehicles $C_1$ to $C_5$ when an unknown gradient disturbance is given to the row running according to a first past control, respectively.
Figure 6A:
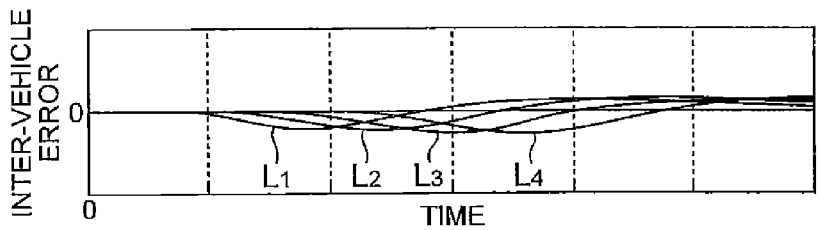
FIGS. 6A to 6C are graphs that show an inter-vehicle error, an inter-vehicle relative speed, and acceleration of each of vehicles $C_1$ to $C_5$ when an unknown gradient disturbance is given to the row running according to a first past control, respectively.

In a case where the row receives an unknown gradient disturbance such as at the time of starting of the aforementioned road gradient, upon comparing FIGS. 5A, 6A and 7A, it is understood that, in the row running control (FIG. 7A) according to the row running control system 1, as compared to the first and second past controls (FIGS. 5A and 6A), the inter-vehicle errors $L_1$ to $L_4$ are small and the inter-vehicle errors $L_1$ to $L_4$ are not amplified.

Figure 5B:
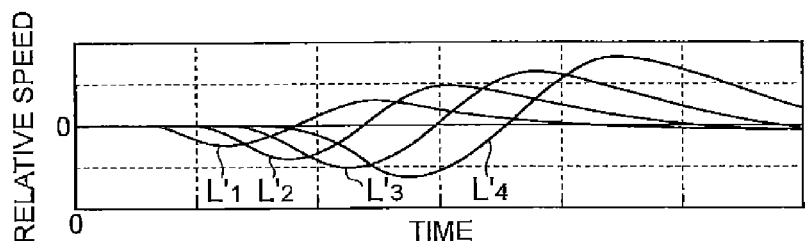
Figure 6B:
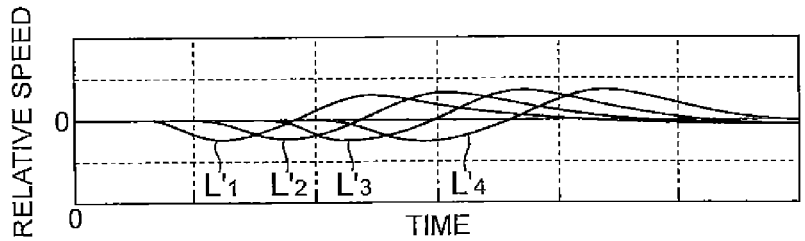

Furthermore, upon comparing FIGS. 5B, 6B and 7B, it is understood that, in the row running control (FIG. 7B) according to the row running control system 1, as compared to the first and second past controls (FIGS. 5B and 6B), the convergence of the inter-vehicle relative speeds $L'_1$ to $L'_4$ is rapid.

Figure 5C:
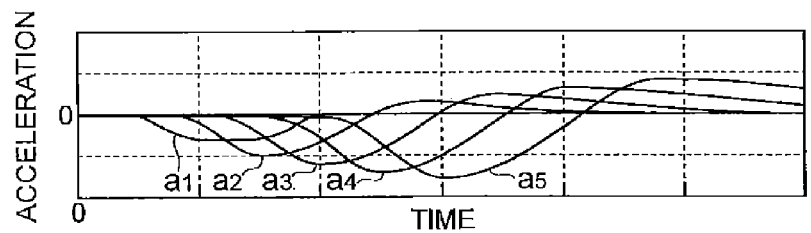
Figure 5D:
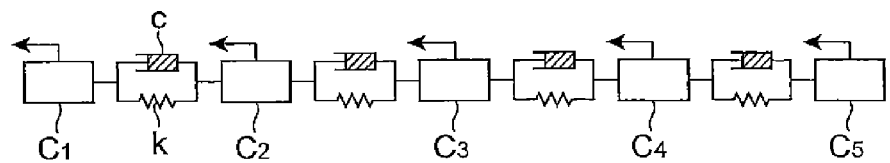
FIG. 5D is a diagram that shows a model of the row running control according to the first past control.
Figure 6C:
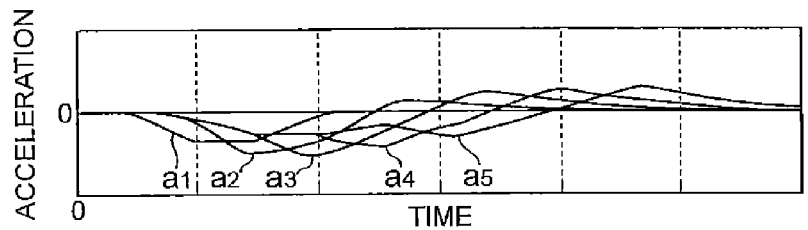
Figure 6D:
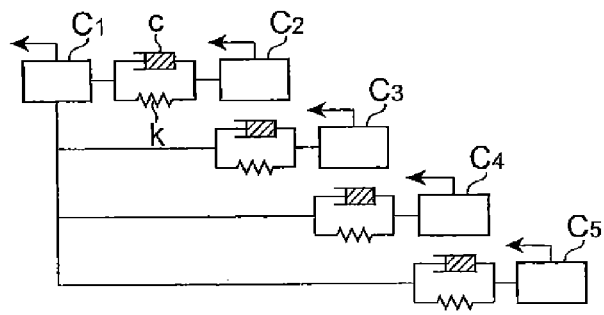
FIG. 6D is a diagram that shows a model of the row running control according to the first past control.

Furthermore, upon comparing FIGS. 5C, 6C and 7C, it is understood that, in the row running control (FIG. 7C) according to the row running control system 1, as compared to the first and second past controls (FIGS. 5C and 6C), the accelerations $a_1$ to $a_5$ are small and the running is smooth.

In this manner, in the row running control according to the row running control system 1, an effect is obtained, in which all the succeeding vehicles $C_2$ to $C_5$ are moved in unison relative to the disturbance to stabilize the inter-vehicle distance, thereby causing the inter-vehicle error to converge smoothly, the accelerations $a_1$ to $a_5$ of the vehicles $C_1$ to $C_5$ are small, and the running is smooth.

Furthermore, in a case where the row receives the aforementioned impulse-like disturbance, upon comparing FIGS. 8A, 9A and 10A, it is understood that, in the row running control (FIG. 10A) according to the row running control system 1, as compared to the first and second past controls (FIGS. 8A and 9A), the inter-vehicle errors $L_1$ to $L_4$ are small, and the inter-vehicle errors $L_1$ to $L_4$ are not amplified.

Furthermore, upon comparing FIGS. 8B, 9B and 10B, it is understood that, in the row running control (FIG. 10B) according to the row running control system 1, as compared to the first and second past controls (FIGS. 8B and 9B), the convergence of the inter-vehicle relative speeds $L'_1$ to $L'_4$ is rapid.

Furthermore, upon comparing FIGS. 8C, 9C and 10C, it is understood that, in the row running control (FIG. 10C) according to the row running control system 1, as compared to the first and second past controls (FIGS. 8C and 9C), the accelerations $a_1$ to $a_5$ are small and the running is smooth.

In this manner, in the row running control according to the row running control system 1, an effect is obtained, in which all the succeeding vehicles $C_2$ to $C_5$ are moved in unison even to the disturbance encountered by only the vehicle $C_3$ to stabilize the inter-vehicle distance, thereby causing the inter-vehicle error to converge smoothly.

As mentioned above, according to the row running control by the row running control system 1, it was shown that row running can be realized which has high stability of inter-vehicle distance and the inter-vehicle relative speed relative to a disturbance, and is also advantageous for the energy conservation due to low acceleration and deceleration.

Second Embodiment

Next, a second embodiment of a row running control system according to the present invention will be described. The physical configuration of a row running control system 201 of the present embodiment is the same as that of the row running control system 1 as shown in FIG. 1, and thus repeated description will be omitted.

According to the aforementioned row running control system 1, even when the disturbance is added to the lead vehicle $C_1$, since the movement alone of the succeeding vehicles $C_2$ to $C_5$ is used to compensate for the disturbance, in this case, an excessive load may be applied to the succeeding vehicles $C_2$ to $C_5$.

Thus, the row running control system 201 is different from the row running control system 1 in which the running states of only the succeeding vehicles $C_2$ to $C_5$ are controlled in that the running states of all of the five constituent vehicles $C_1$ to $C_5$ are controlled. That is, in the row running control system 201, the control intervenes in the running states of all the constituent vehicles $C_1$ to $C_5$ including the running state of the lead vehicle $C_1$. In this case, a target acceleration instruction value $u_0$ of the lead vehicle $C_1$ is manually determined by a driver or is automatically determined based on a predetermined running schedule or the like.

In the row running control system 201, the acceleration instruction value vector $u_c$ in the state space equation (1) is a vector including five acceleration instruction values $u_1$ to $u_5$ of all the vehicles $C_1$ to $C_5$ and is represented as below.

$$u_c = (u_1, u_2, u_3, u_4, u_5)^T$$

Moreover, the acceleration instruction value vector $u_c$ is represented by equation (5) as below.

[Equation 5]

$$u_c = B_{ff} u_o + Kx \quad (5)$$

In addition, $B_{ff}$ in the equation (5) is a vector different from $B_{ff}$ in the aforementioned equation (2).

Herein, the feedback gain matrix K is a matrix of 13 rows×5 columns.

Furthermore, the evaluation function J becomes equation (6) as below.

[Equation 6]

$$J = \int \left\{ \varepsilon_L (L_1^2 + L_2^2 + L_3^2 + L_4^2) + \varepsilon_{dL}\left(\frac{dL_1^2}{dt} + \frac{dL_2^2}{dt} + \frac{dL_3^2}{dt} + \frac{dL_4^2}{dt}\right) + \varepsilon_u (u_1^2 + u_2^2 + u_3^2 + u_4^2 + u_5^2) \right\} dt \quad (6)$$

Moreover, as in the case of the row running control system 1, by obtaining the feedback gain matrix $K_2$ that minimizes the evaluation function J of the equation (6), the acceleration instruction value vector $u_c$ (that is, a group of the acceleration instruction values $u_1$ to $u_5$) is obtained which minimizes the evaluation function J.

Next, the specific process to be performed by the row running control system 201 of the respective vehicles $C_1$ to $C_5$ will be described with reference to the flow chart. The vehicle control ECU 10 of the row running control system 201 of all the vehicles $C_1$ to $C_5$ performs the process described below in parallel, respectively.

Firstly, at the point of time when the constituent vehicles $C_1$ to $C_5$ constituting the row are determined, similarly to the case of the row running control system 1 (see FIG. 3), the vehicle control ECU 10 of the respective vehicles $C_1$ to $C_5$ obtains the feedback gain matrix $K_2$ and records the same in the information memory portion 10a.

Figure 11:
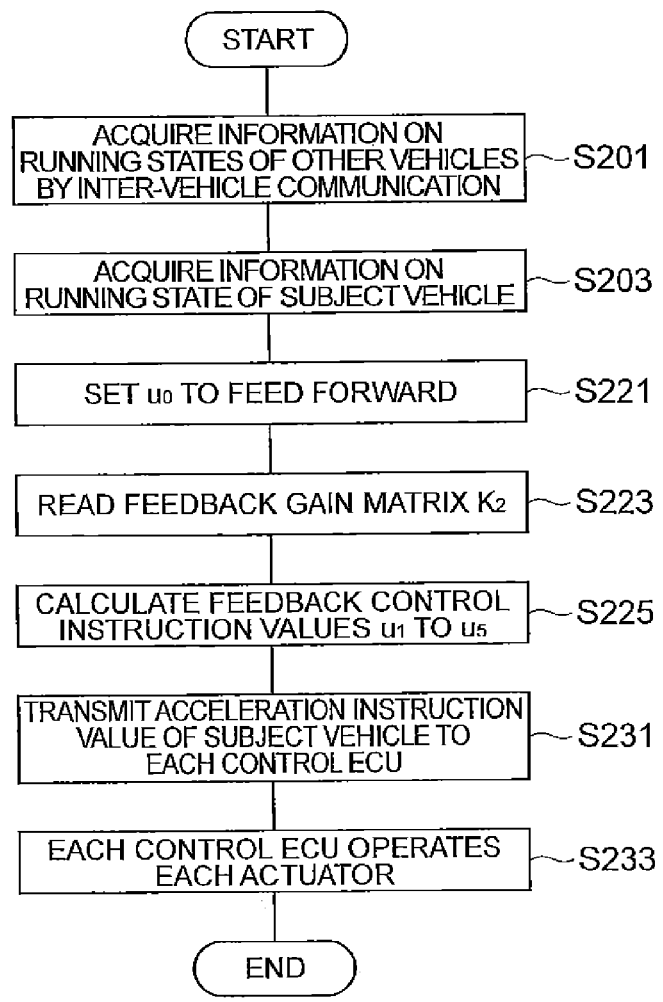
FIG. 11 is a flow chart that shows the process to be performed by a row running control system of a second embodiment during row running.

Next, during row running, as shown in FIG. 11, the vehicle control ECU 10 acquires the front inter-vehicle distances, the rear inter-vehicle distances, the vehicle speeds, and the accelerations of the four other vehicles by means of the inter-vehicle communication (S201). Next, the front inter-vehicle distance, the rear inter-vehicle distance, the vehicle speed, and the acceleration of the subject vehicle are acquired from the sensor groups 21a to 24a of the subject vehicle (S203). By means of the process, the vehicle control ECU 10 acquires the front inter-vehicle distances, the rear inter-vehicle distances, the vehicle speeds, and the accelerations of all the vehicles $C_1$ to $C_5$, calculates the accelerations $a_1$ to $a_5$, the inter-vehicle errors $L_1$ to $L_4$, and the inter-vehicle relative speeds $L'_1$ to $L'_4$ based on the acquired information, and can obtain the state vector x.

Next, in the above equation (6), the target acceleration instruction value $u_0$ of the lead vehicle $C_1$ is set to feed forward (S221), and the feedback gain matrix $K_2$ is read from the information memory portion 10a (S223). Moreover, the acceleration instruction value vector $u_c$ is calculated based on the target acceleration instruction value $u_0$ and the state vector x using the feedback gain matrix $K_2$, and the feedback control instruction values $u_1$ to $u_5$ are obtained (S225).

Then, the vehicle control ECU 10 of the vehicles $C_1$ to $C_5$ transmits an acceleration instruction value $u_n$ (for example, the acceleration instruction value $u_3$ if the subject vehicle is the vehicle $C_3$, and the acceleration instruction value $u_4$ if the subject vehicle is the vehicle $C_4$) of the subject vehicle from among the calculated acceleration instruction values $u_1$ to $u_5$ to the engine control ECU 31 and the brake control ECU 32 (S231). Moreover, the engine control ECU 31 operates the throttle actuator 31a based on the received acceleration instruction value $u_n$, and the brake control ECU 32 operates the brake actuator 32a based on the received acceleration instruction value $u_n$ (S233). The processes of S201 to S233 of FIG. 11 as above are repeated during row running. By means of these processes, the decelerations and the accelerations of the five succeeding vehicles $C_1$ to $C_5$ are controlled, whereby the row running of the five vehicles $C_1$ to $C_5$ is accomplished.

As described above, the row running control system 1 to be mounted on the respective vehicles $C_1$ to $C_5$ acquires the accelerations $a_1$ to $a_5$, the inter-vehicle errors $L_1$ to $L_4$, and the inter-vehicle relative speeds $L'_1$ to $L'_4$ concerning all the vehicles $C_1$ to $C_5$ in the row. Moreover, a group of the acceleration instruction values $u_1$ to $u_5$ for all the succeeding vehicles $C_1$ to $C_5$ is determined by the LQ control using the state vector x that includes the acquired accelerations $a_1$ to $a_5$, the inter-vehicle errors $L_1$ to $L_4$, and the inter-vehicle relative speeds $L'_1$ to $L'_4$ as elements thereof. Moreover, the row running control system 1 of the respective vehicles $C_1$ to $C_5$ adopts the acceleration instruction value $u_n$ concerning the subject vehicle $C_n$ among the determined acceleration instruction values $u_1$ to $u_5$, and the engine control ECU 31 and the brake control ECU 32 operate the throttle actuator 31a and the brake actuator 32a based on the acceleration instruction value $u_n$.

According to the row running control system 201, even in a case where any one of the vehicles $C_1$ to $C_5$ encounters the disturbance during row running, all the five vehicles $C_1$ to $C_5$ are moved in unison to stabilize the distance between the vehicles, thereby causing the error between the vehicles to converge smoothly. Thus, according to the row running control system 201, it is possible to realize row running resistant to a disturbance that disturbs the inter-vehicle distance or the inter-vehicle relative speed between the vehicles of the respective vehicles $C_1$ to $C_5$.

Next, the description will be given of the results of simulations performed by the inventors so that the disturbance stability of the running states of the vehicles $C_1$ to $C_5$ according to the row running control system 201 could be evaluated.

Figure 12A:
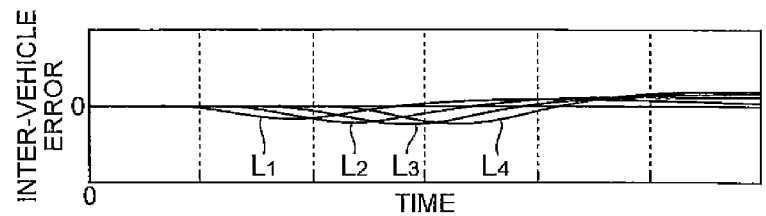
FIGS. 12A to 12C are graphs that show an inter-vehicle error, an inter-vehicle relative speed, and acceleration of each of vehicles $C_1$ to $C_5$ when an unknown gradient disturbance is given to the row running according to a row running control system of a second embodiment, respectively.
Figure 12B:
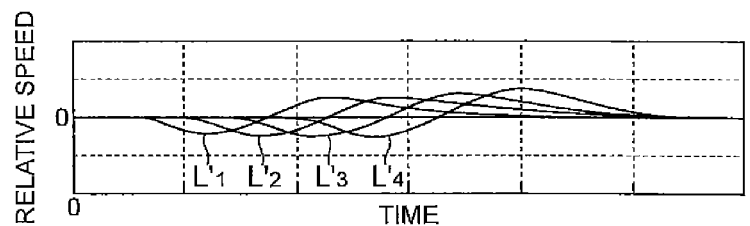
Figure 12C:
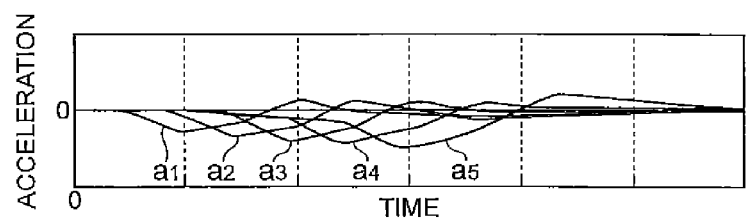

FIG. 12 shows the inter-vehicle errors $L_1$ to $L_4$ (FIG. 12A), the inter-vehicle relative speeds $L'_1$ to $L'_4$ (FIG. 12B), and the accelerations $a_1$ to $a_5$ (FIG. 12C) of the respective vehicles $C_1$ to $C_5$ in a case where the row entered an unknown road gradient of 1 deg while the row normally ran at 15 km/h in the row running control according to the row running control system 201. That is, in this simulation, the same disturbance as FIGS. 5 and 7 was applied to the row. Furthermore, the scale of the longitudinal axis of FIG. 12A showing the inter-vehicle errors $L_1$ to $L_4$ is the same as those of FIGS. 5A and 7A, the scale of the longitudinal axis of FIG. 12B showing the inter-vehicle relative speeds $L'_1$ to $L'_4$ is the same as those of FIGS. 5B and 7B, and the scale of the longitudinal axis of FIG. 12C showing the accelerations $a_1$ to $a_5$ is the same as those of FIGS. 5C and 7C. Furthermore, the scales of the horizontal axis of FIGS. 12A to 12C showing the time are the same as FIGS. 5 and 8.

Herein, when comparing FIGS. 7A and 7B with FIGS. 12A and 12B, respectively, it can be understood that, in the row running control system 201, variations in inter-vehicle error and inter-vehicle relative speed were small, but only slightly so, as compared to the row running control system 1. Furthermore, when comparing FIG. 7C with FIG. 12C, it can be understood that, in the row running control system 201, a variation in acceleration is particularly small as compared to the row running control system 1. As shown in FIG. 12C, in the row running control system 201, after the lead vehicle $C_1$ is decelerated by the start of the gradient, the lead vehicle $C_1$ changes to an accelerating state due to the fact that the inter-vehicle distance between the lead vehicle $C_1$ and the succeeding vehicle $C_2$ is narrowed. For this reason, a control is provided which does not cause too much deceleration of the entire row. In this manner, according to the row running control system 201, in addition to the working effect by the row running control system 1, it was shown that smooth running with little acceleration and deceleration can be realized.

Third Embodiment

Figure 13:
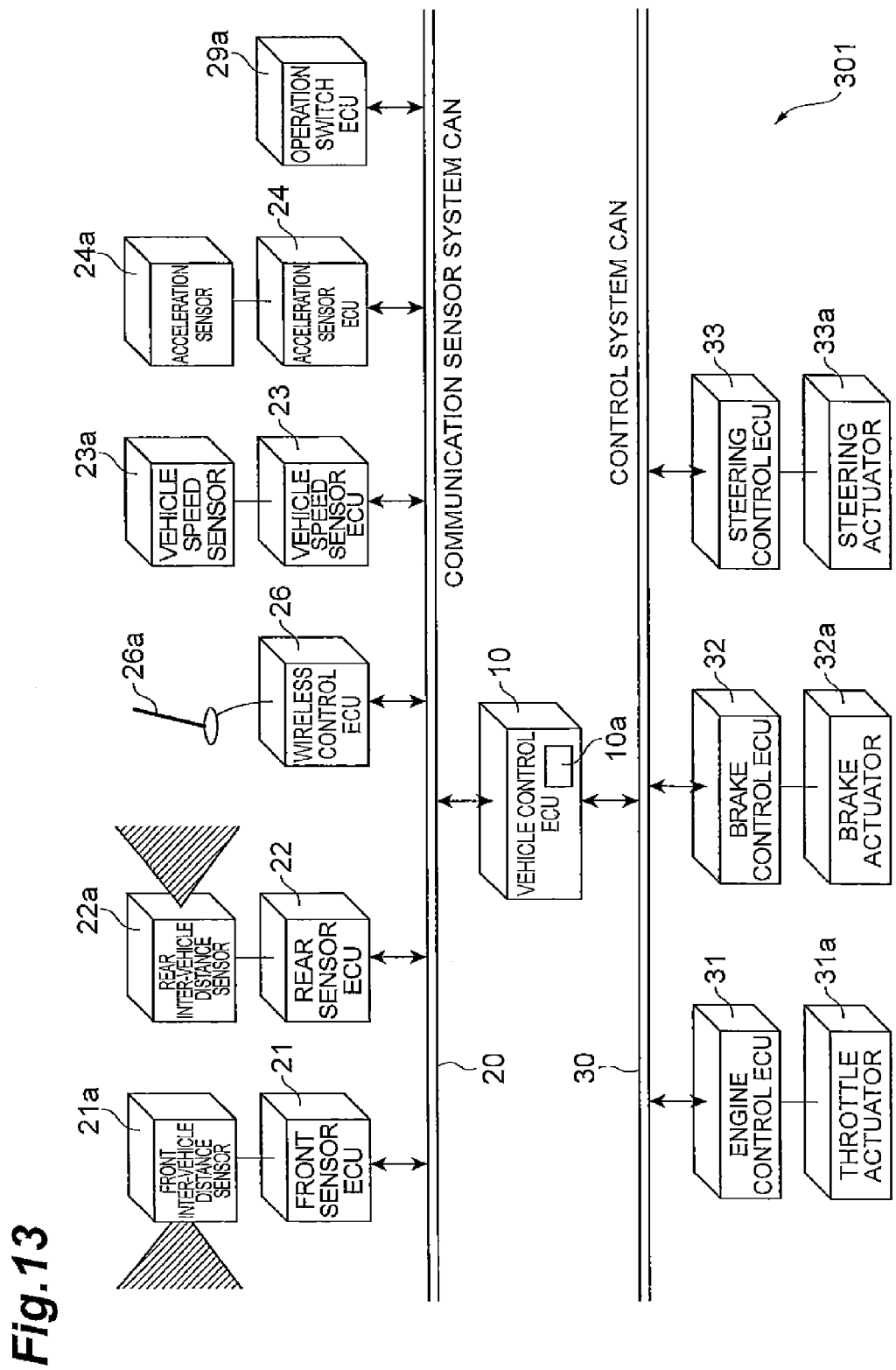
FIG. 13 is a block diagram that shows a third embodiment of a row running control system of the present invention.

Next, a third embodiment of a row running control system according to the present invention will be described. As shown in FIG. 13, a row running control system 301 of the present embodiment further includes an operation switch 29a, in addition to the row running control system 1. The operation switch 29a is connected to the vehicle control ECU 10 via the communication sensor system CAN 20. The operation switch 29a receives the selection operation by a driver and transmits the operation to the vehicle control ECU 10 as an electric signal.

In the row running control system 301, the operation switch 29a (see FIG. 13), for example in the lead vehicle $C_1$, can selectively switch between whether the running states of four succeeding vehicles $C_2$ to $C_5$ are controlled (called "a first type of control"), as in the row running control system 1, or the running states of all the vehicles $C_1$ to $C_5$ are controlled (called "a second type of control"), as in the row running control system 201. The control type selection information showing which type of control is selected in the operation switch 29a of the lead vehicle $C_1$ is shared by all the vehicles $C_1$ to $C_5$ by means of inter-vehicle communication.

Next, the specific process to be performed by the row running control system 301 of the respective vehicles $C_1$ to $C_5$ will be described with reference to the flow chart. The vehicle control ECU 10 of the row running control system 301 of all the vehicles $C_1$ to $C_5$ performs the process described below in parallel, respectively.

At the point of time when the constituent vehicles $C_1$ to $C_5$ constituting the row are determined, the vehicle control ECU 10 calculates both of the feedback gain matrix $K_1$ used in the first type of control and the feedback gain matrix $K_2$ used in the second type of control based on the vehicle specification information of all the vehicles $C_1$ to $C_5$ and records the matrices on the information memory portion 10a.

Figure 14:
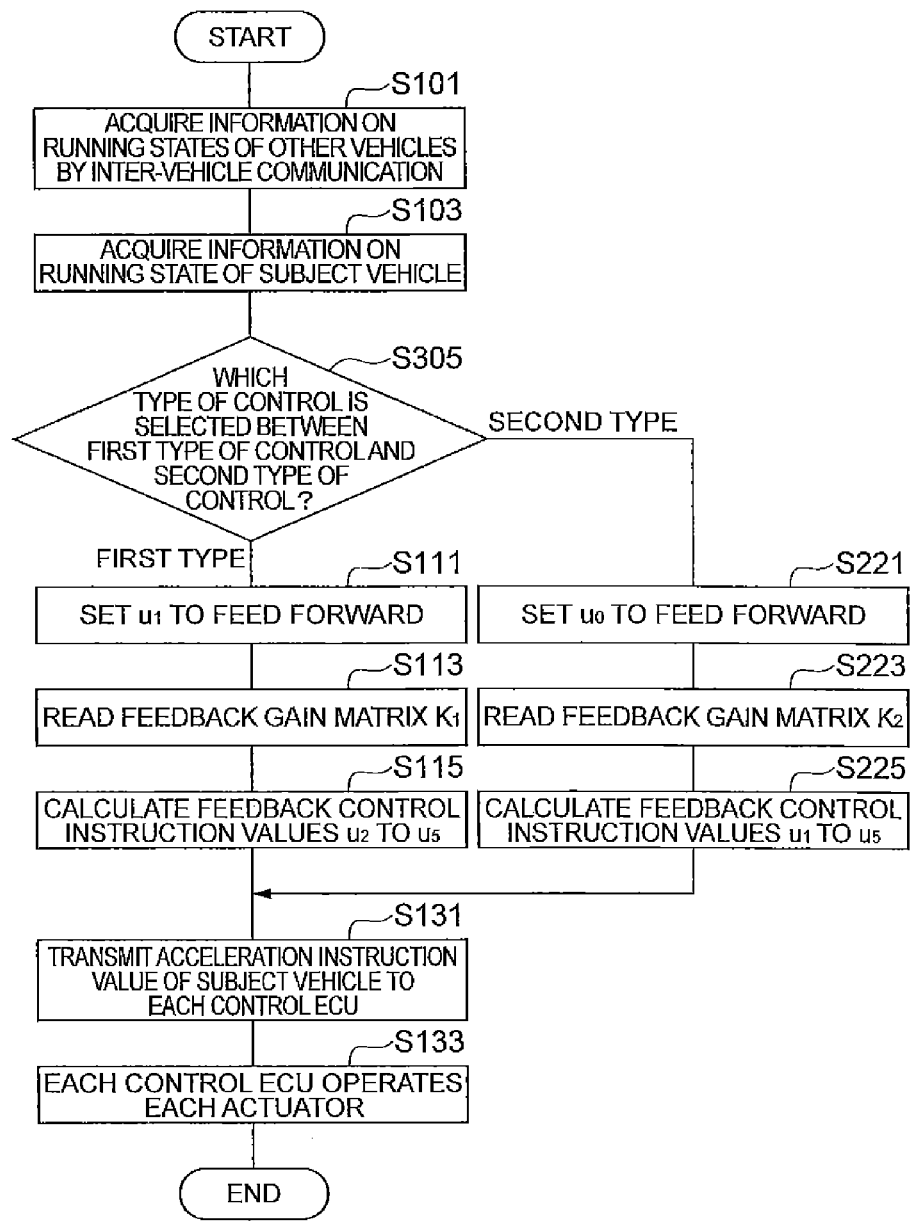
FIG. 14 is a flow chart that shows the process to be performed by a row running control system of a third embodiment during row running.

Moreover, during row running, as shown in FIG. 14, the vehicle control ECU 10 performs the processes S101 and S103 and then decides which type of control is selected based on the control type selection information (S305).

Herein, the vehicle control ECU 10 performs the processes S111, S113, and S115 when the first type of control is selected, and performs the processes S221, S223, and S225 when the second type of control is selected. Then, the vehicle control ECU 10 performs the process S131, and the engine control ECU 31 and the brake control ECU 32 perform the process S133. The processes S101 to S133 of FIG. 14 are repeated during row running. In addition, in FIG. 14, the same or equivalent processes as those of FIG. 4 or FIG. 11 are denoted by the same reference numerals, and repeated descriptions are omitted. According to the processes as above, it is possible to selectively perform the first or second type of control by the operation of the operation switch 29a of the lead vehicle $C_1$ by means of the intention of the driver of the lead vehicle $C_1$. Furthermore, in this case, the control type may be selected by any one operation switch 29a of other vehicles $C_2$ to $C_5$ without being limited to the operation switch 29a of the lead vehicle $C_1$.

Fourth Embodiment

Next, a fourth embodiment of a row running control system according to the present invention will be described. The physical configuration of a row running control system 401 of the present embodiment is the same as that of the row running control system 1 as shown in FIG. 1, and thus repeated description will be omitted.

In the aforementioned row running control system 201, the control also intervenes in the running state of the lead vehicle $C_1$. However, the lead vehicle $C_1$ needs to stably perform the running while understanding the relationship between the vehicle and the environment, such as obstruction. For example, the obstructions to the lead vehicle $C_1$ include a preceding vehicle other than one in the row running in front, or obstructions other than vehicles that are present in the environment. Thus, in some cases, it is desirable that the control does not excessively intervene in the running state of the lead vehicle $C_1$ depending on the environmental situation of the lead vehicle $C_1$. For example, in a case where there is an obstruction in a position relatively close to the lead vehicle $C_1$, since it is natural that risk management with respect to the obstruction takes precedence over the row running in the lead vehicle $C_1$, the extent to which the control intervenes in the running state of the lead vehicle $C_1$ needs to be reduced as compared to a case where there are no obstructions.

In view of the above, in the row running control system 401 of the present embodiment, the extent to which the control intervenes in the running state of the lead vehicle $C_1$ is changed depending on the forward risk of the lead vehicle $C_1$.

Specifically, in the row running control system 401, the row running control is performed using an evaluation function J shown in equation (7) as below instead of the evaluation function J of the equation (7) in the aforementioned row running control system 201.

[Equation 7]

$$J = \int \left\{ \varepsilon_L (L_1^2 + L_2^2 + L_3^2 + L_4^2) + \varepsilon_{dL} \left( \frac{dL_1^2}{dt} + \frac{dL_2^2}{dt} + \frac{dL_3^2}{dt} + \frac{dL_4^2}{dt} \right) + \varepsilon_{u1} u_1^2 + \varepsilon_{u25} (u_2^2 + u_3^2 + u_4^2 + u_5^2) \right\} dt \quad (7)$$

However, when indicating a TTC (Time to Collision; a collision prediction time) of the lead vehicle $C_1$ by $TTC_1$, $\varepsilon_{u1}$ of the equation (7) is indicated by $\varepsilon_{u1} = f(TTC_1)$. That is, $\varepsilon_{u1}$ is a function of $TTC_1$, and the relationship between $\varepsilon_{u1}$ and $TTC_1$ is, for example, indicated by a graph of FIG. 15.

Figure 15:
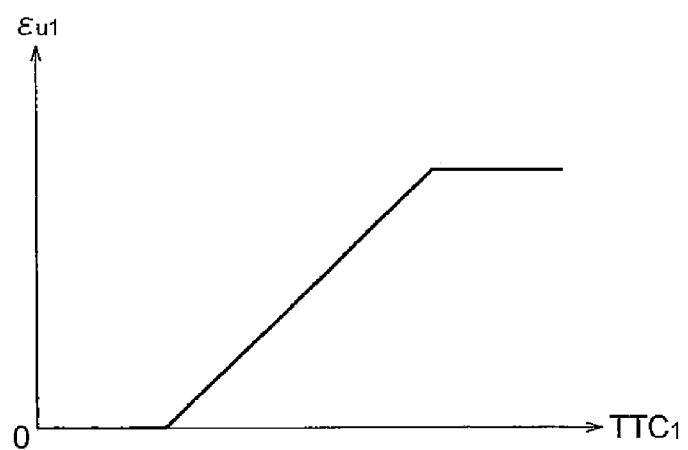
FIG. 15 is a graph that shows a relationship between TTC of the lead vehicle $C_1$ and a weight $\epsilon_{u1}$ included in an evaluation function.

In the factor of the acceleration instruction value $u_1$ of the lead vehicle $C_1$ and in the factors of the acceleration instruction values $u_2$ to $u_5$ of the succeeding vehicles $C_2$ to $C_5$ of the equation (7), separate weights $\varepsilon_{u1}$ and $\varepsilon_{u25}$ are set, respectively. That is, it is possible to adjust the balance between the extent to which the control intervenes in the acceleration instruction value $u_1$ of the lead vehicle $C_1$ and the extent to which the control intervenes in the acceleration instruction values $u_2$ to $u_5$ of the succeeding vehicles $C_2$ to $C_5$, by distributing the weights $\varepsilon_{u1}$ and $\varepsilon_{u25}$ included in the evaluation function J. In addition, since $\varepsilon_{u1}$ is a function of $TTC_1$, the extent to which the control intervenes in the acceleration instruction value $u_1$ of the lead vehicle $C_1$ is changed based on the TTC of the lead vehicle $C_1$. That is, in the LQ control that uses the evaluation function J, as shown in FIG. 15, the higher the TTC of the lead vehicle $C_1$ (the risk of the collision is low), the higher the $\varepsilon_{u1}$, and thus, the extent of the intervention of the control to the acceleration instruction value $u_1$ of the lead vehicle $C_1$ is increased. Moreover, the lower the TTC of the lead vehicle $C_1$ (the risk of the collision is high), the lower the $\varepsilon_{u1}$, and thus, the extent of the intervention of the control to the acceleration instruction value $u_1$ of the lead vehicle $C_1$ is decreased. Furthermore, when the TTC of the lead vehicle $C_1$ is equal to or less than a predetermined scope, $\varepsilon_{u1}$ is zero, and the control does not intervene in the acceleration instruction value $u_1$ of the lead vehicle $C_1$.

In addition, TTC means a prediction time until a vehicle collides with a front obstruction (for example, a vehicle running in the front), and TTC of the lead vehicle $C_1$ can be calculated as a value that divides the distance from the lead vehicle $C_1$ to the front obstruction by the relative speed between the lead vehicle $C_1$ and the front obstruction.

Next, a specific process to be performed by the row running control system 401 of the respective vehicles $C_1$ to $C_5$ will be described with reference to the flow chart. The vehicle control ECU 10 of the row running control system 401 of all the vehicles $C_1$ to $C_5$ performs a process described below in parallel, respectively.

Figure 16:
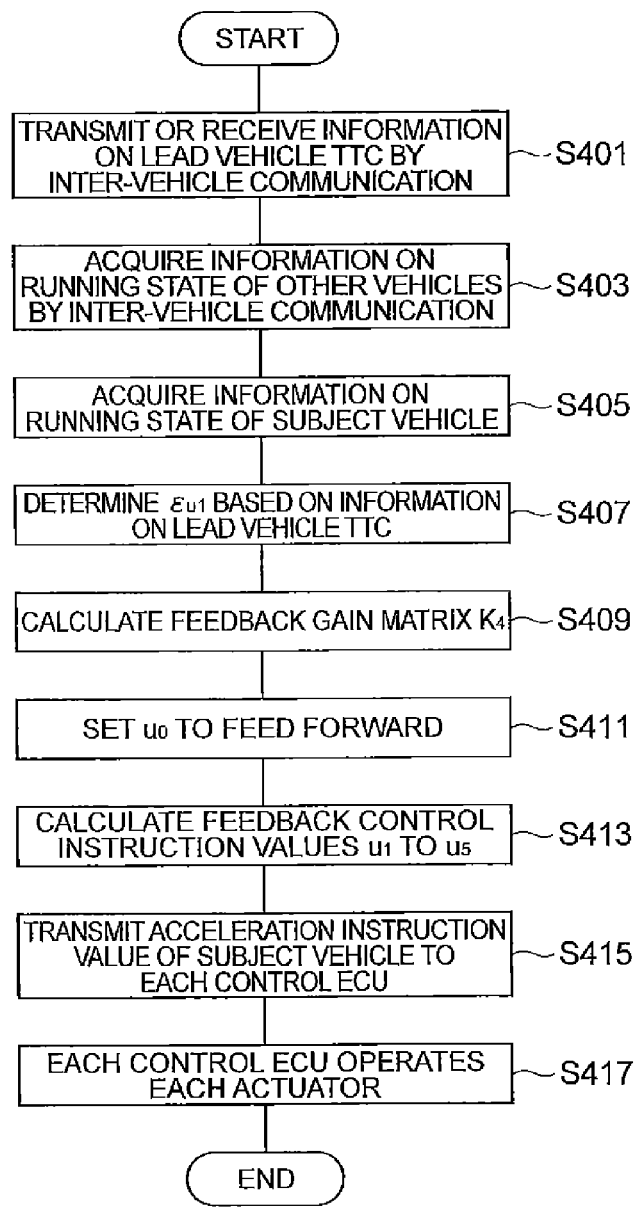
FIG. 16 is a flow chart that shows the process to be performed by a row running control system of a fourth embodiment during row running.

Firstly, as shown in FIG. 16, the vehicle control ECU 10 of the lead vehicle $C_1$ calculates the TTC in the lead vehicle $C_1$ and transmits the same to the succeeding vehicles $C_2$ to $C_5$ as the head vehicle TTC information by an inter-vehicle communication (S401). Herein, the vehicle control ECU 10 of the lead vehicle $C_1$ calculates the TTC, for example, based on the vehicle speed information of the preceding vehicle obtained by the inter-vehicle communication from a preceding vehicle running in front, the inter-vehicle distance information between the subject vehicle and the preceding vehicle obtained by the front inter-vehicle distance sensor 21a, and the vehicle speed information of the subject vehicle $C_1$ obtained by the vehicle speed sensor 23a. By means of the calculation of the TTC information and the transmission thereof to the succeeding vehicles $C_2$ to $C_5$ by the lead vehicle $C_1$, the front vehicle TTC information is shared by all the vehicles $C_1$ to $C_5$.

Next, the vehicle control ECU 10 acquires the front inter-vehicle distances, the rear inter-vehicle distances, the vehicle speeds, and the accelerations of the four other vehicles by means of the inter-vehicle communication (S403). Next, the front inter-vehicle distance, the rear inter-vehicle distance, the vehicle speed, and the acceleration of the subject vehicle are acquired from the sensor groups 21a to 24a of the subject vehicle (S405). By means of the process, the vehicle control ECU 10 acquires the front inter-vehicle distances, the rear inter-vehicle distances, the vehicle speeds, and the accelerations of all the vehicles $C_1$ to $C_5$, calculates the accelerations $a_1$ to $a_5$, the inter-vehicle errors $L_1$ to $L_4$, and the inter-vehicle relative speeds $L'_1$ to $L'_4$ based on the acquired information, and can obtain the state vector x.

Next, the vehicle control ECU 10 determines $\varepsilon_{u1}$ from the relationship shown in FIG. 15 based on the TTC information of the lead vehicle (S407). Moreover, the determined $\varepsilon_{u1}$ is applied to the aforementioned equation (7), thereby allowing calculation of a feedback gain matrix $K_4$ that minimizes the evaluation function J of the equation (7) (S409). Moreover, in the aforementioned equation (5), the target acceleration instruction value $u_0$ of the lead vehicle $C_1$ is set to feed forward (S411), the acceleration instruction value vector $u_c$ is calculated based on the acceleration instruction value $u_0$ and the state vector x using the calculated feedback gain matrix $K_4$, and the feedback control instruction values $u_1$ to $u_5$ are obtained (S413).

Then, the vehicle control ECU 10 of the vehicles $C_1$ to $C_5$ transmits an acceleration instruction value $u_n$ (for example, the acceleration instruction value $u_3$ if the subject vehicle is the vehicle $C_3$, and the acceleration instruction value $u_4$ if the subject vehicle is the vehicle $C_4$) of the subject vehicle among the calculated acceleration instruction values $u_1$ to $u_5$ to the engine control ECU 31 and the brake control ECU 32 (S415). Moreover, the engine control ECU 31 operates the throttle actuator 31a based on the received acceleration instruction value $u_n$, and the brake control ECU 32 operates the brake actuator 32a based on the received acceleration instruction value $u_n$ (S417). The processes of S401 to S417 of FIG. 16 as above are repeated during row running.

According to the row running control system 401 described above, the intervention amount of the row running control to the lead vehicle $C_1$ is automatically adjusted depending on the forward risk to the lead vehicle $C_1$. For example, according to the relationship between the lead vehicle TTC and $\varepsilon_{u1}$ shown in FIG. 15 as an example, in a situation where the TTC of the lead vehicle $C_1$ is low (that is, the forward risk to the head vehicle is high), $\epsilon_{u1}$ is zero or a sufficiently small value, and the intervention amount of the control to the lead vehicle $C_1$ can be zero or sufficiently decreased. Thus, for example, it is possible to avoid demand for high acceleration and deceleration by the row running control in the lead vehicle $C_1$, when the inter-vehicle distance between the vehicle and other vehicles in front of the lead vehicle $C_1$ is small and the front risk is high.

Fifth Embodiment

Next, a fifth embodiment of a row running control system according to the present invention will be described. The physical configuration of a row running control system 501 of the present embodiment is the same as that of the row running control system 1 as shown in FIG. 1, and repeated description will be omitted.

A major object of row running of the vehicles is an improvement in fuel efficiency. Elements to be considered for an improvement in fuel efficiency in the row running are classified broadly into two elements of reducing the acceleration and the deceleration of the respective vehicles $C_1$ to $C_5$ and stably maintaining the respective inter-vehicle distances to be short to reduce air resistance. Herein, since air resistance is proportional to the square of the vehicle speed, the efficiency of air resistance reduction greatly depends on the vehicle speed. That is, in order to effectively promote an improvement in fuel efficiency, as the vehicle speed of the row running is increased, the efficiency of air resistance reduction due to the inter-vehicle distance stability is considered important, and as the vehicle speed is decreased, the efficiency of the acceleration and deceleration reduction of the vehicle is considered important.

In view of this knowledge, in the row running control system 501 of the present embodiment, in the row running control, there is a configuration such that the balance distribution between the elements of the acceleration and deceleration reduction of the vehicle and the element of the inter-vehicle distance stability of the vehicle is changed depending on the vehicle speeds of the vehicles $C_1$ to $C_5$.

Specifically, in the aforementioned row running control system 201, the row running control system 501 is a system in which the weights $\epsilon_u$ and $\epsilon_L$ of the evaluation function J of the equation (6) are changeable depending on the vehicle speed. That is, the weights $\epsilon_u$ and $\epsilon_L$ are set in the factor concerning the acceleration instruction values $u_1$ to $u_5$ of the vehicles $C_1$ to $C_5$ and in the factor concerning the inter-vehicle error $L_1$ to $L_4$ of the equation (6), respectively. Thus, it is possible to adjust the balance between an element of the acceleration and deceleration reduction of the vehicle and an element of the inter-vehicle distance stability of the vehicle in the row running control by distributing the weights $\epsilon_u$ and $\epsilon_L$.

Figure 17:
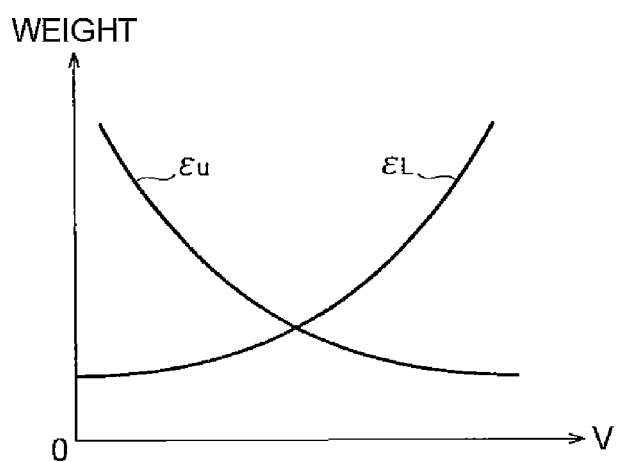
FIG. 17 is a graph that shows a relationship between a vehicle speed V and weights $\epsilon_u$ and $\epsilon_L$ included in an evaluation function.

Thus, the weights $\epsilon_u$ and $\epsilon_L$ are set as functions of the vehicle speed V shown in FIG. 17. That is, the smaller the vehicle speed V, the higher the $\epsilon_u$ and the smaller the $\epsilon_L$, and the higher the vehicle speed V, the smaller the $\epsilon_u$ and the higher the $\epsilon_L$. Using the weights $\epsilon_u$ and $\epsilon_L$, in the LQ control that uses the evaluation function J, the lower the vehicle speed of the row running, the element of acceleration and deceleration reduction of the vehicle is considered to be of relative importance, and the higher the vehicle speed of the row running, the greater the relative importance of the element of the inter-vehicle distance stability of the vehicle. In this manner, the weights $\epsilon_u$ and $\epsilon_L$ corresponding to the vehicle speed V are automatically set, whereby the row running control is carried out in which the element of the acceleration and deceleration reduction of the vehicle and the element of the inter-vehicle distance stability of the vehicle are given importance by a suitable balance corresponding to the vehicle speed of the row running.

Next, the specific process to be performed by the row running control system 501 of the respective vehicles $C_1$ to $C_5$ will be described with reference to the flow chart. The vehicle control ECU 10 of the row running control system 501 of all the vehicles $C_1$ to $C_5$ performs the process described below in parallel, respectively.

Figure 18:
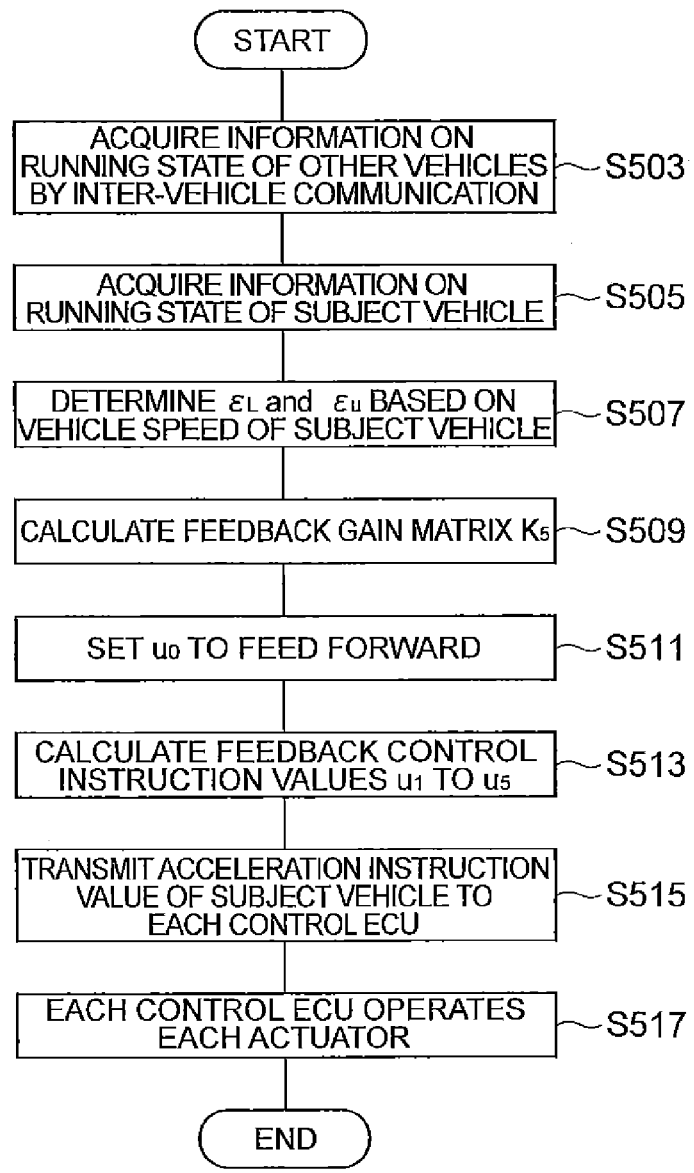
FIG. 18 is a flow chart that shows the process to be performed by a row running control system of a fourth embodiment during row running.

Firstly, as shown in FIG. 18, the vehicle control ECU 10 acquires the front inter-vehicle distances, the rear inter-vehicle distances, the vehicle speeds and the accelerations of four other vehicles by means of the inter-vehicle communication (S503). Next, the front inter-vehicle distance, the rear inter-vehicle distance, the vehicle speed, and the acceleration of the subject vehicle are acquired from the sensor groups 21a to 24a of the subject vehicle (S505). By means of the process, the vehicle control ECU 10 acquires the front inter-vehicle distances, the rear inter-vehicle distances, the vehicle speeds, and the accelerations of all the vehicles $C_1$ to $C_5$, calculates the accelerations $a_1$ to $a_5$, the inter-vehicle errors $L_1$ to $L_4$, and the inter-vehicle relative speeds $L'_1$ to $L'_4$ based on the acquired information, and can obtain the state vector x.

Next, the vehicle control ECU 10 determines $\epsilon_u$ and $\epsilon_L$ from the relationship shown in FIG. 17 based on the vehicle speed V of the subject vehicle (S507). Moreover, the determined $\epsilon_u$ and $\epsilon_L$ are applied to the aforementioned equation (6), thereby calculating a feedback gain matrix $K_5$ that minimizes the evaluation function J of the equation (6) (S509). Moreover, in the aforementioned equation (5), the target acceleration instruction value $u_0$ of the lead vehicle $C_1$ is set to feed forward (S511), the acceleration instruction value vector $u_c$ is calculated based on the acceleration instruction value $u_0$ and the state vector x using the calculated feedback gain matrix $K_5$, and the feedback control instruction values $u_1$ to $u_5$ are obtained (S513).

Then, the vehicle control ECU 10 of the vehicles $C_1$ to $C_5$ transmits an acceleration instruction value $u_n$ (for example, the acceleration instruction value $u_3$ if the subject vehicle is the vehicle $C_3$, and the acceleration instruction value $u_4$ if the subject vehicle is the vehicle $C_4$) of the subject vehicle among the calculated acceleration instruction values $u_1$ to $u_5$ to the engine control ECU 31 and the brake control ECU 32 (S515). Moreover, the engine control ECU 31 operates the throttle actuator 31a based on the received acceleration instruction value $u_n$, and the brake control ECU 32 operates the brake actuator 32a based on the received acceleration instruction value $u_n$ (S517). The processes of S501 to S517 of FIG. 18 as above are repeated during row running.

According to the row running control system 501 described above, when the vehicles $C_1$ to $C_5$ constituting the row runs at high speeds, even if energy loss due to the acceleration and the deceleration of the vehicles $C_1$ to $C_5$ is slightly increased, row running is carried out in which the inter-vehicle errors $L_1$ to $L_4$ are suppressed in order that the element of the air resistance reduction be considered as important. On the contrary, when the vehicles $C_1$ to $C_5$ run at low speeds, even if the inter-vehicle errors $L_1$ to $L_4$ are slightly increased, row running is carried out in which the element of the acceleration and deceleration reduction of the vehicles $C_1$ to $C_5$ are considered important. In this manner, according to the row running control system 501, a row running control is performed in which the element of the acceleration and deceleration reduction of the vehicle and the element of the inter-vehicle distance stability of the vehicle are considered by the balance based on the speed of the row running, whereby an improvement in fuel efficiency can be effectively promoted.

In addition, the present invention is not limited to the aforementioned first to fifth embodiments. For example, in the first to fifth embodiments, the respective row running control systems included in the respective vehicles $C_1$ to $C_5$ independently perform the overlapped calculation processes in parallel, respectively. However, any one of the vehicles $C_1$ to $C_5$ or the row running control system of one vehicle may perform the aforementioned calculation process to calculate the acceleration instruction values $u_2$ to $u_5$ (or the acceleration instruction values $u_1$ to $u_5$), and then transmit the calculation result to the respective other vehicles by means of the inter-vehicle communication. However, the method in which the respective row running control systems included in the respective vehicles $C_1$ to $C_5$ individually perform the calculation process, respectively, is excellent in that delays due to the inter-vehicle communication does not occur. Furthermore, the respective row running control system included in the respective vehicles $C_1$ to $C_5$ may individually perform the calculation process, respectively, and exchange the calculation results through inter-vehicle communication to each other, thereby performing cross-checking of the calculation results.

Furthermore, for example, although, in the second embodiment, the acceleration instruction values $u_1$ to $u_5$ of all the five vehicles $C_1$ to $C_5$ are included in the evaluation function J of the equation (6), at least one of the acceleration instruction values $u_1$ to $u_5$ may be included in the evaluation function J. For example, when there is a situation where it is not desired that the control intervene in some of the vehicles $C_1$ to $C_5$, the acceleration instruction value $u_n$ of the vehicle for which intervention of the control is not desired may be excluded from the equation of the evaluation function J. For example, when the vehicle $C_3$ is a VIP vehicle, by removing $u_3^2$ concerning the acceleration instruction value of the vehicle $C_3$ from the right side of the equation (6), the control does not intervene in the running state of the vehicle $C_3$, and it is possible to avoid a demand for excessive acceleration and deceleration in the vehicle $C_3$ as the VIP vehicle.

Furthermore, in the first to fifth embodiments, cases have been described where the row running is performed by five vehicles $C_1$ to $C_5$ as an example. However, it is apparent that row running by any arbitrary number of vehicles can be realized without being limited to five in imitation of the row running control in the first to fifth embodiments.

INDUSTRIAL APPLICABILITY

The present invention relates to a row running control system that controls the running states of the respective vehicles so that a plurality of vehicles runs in a row, and improves the disturbance stability of row running.

The invention claimed is:

1. A row running control system that controls a running state of at least one vehicle of a plurality of vehicles that are in a row so that the plurality of vehicles maintains the row, the row running control system comprising:
an electronic control unit of a computer configured to:
calculate at least one running control value of the at least one vehicle of the plurality of vehicles, the at least one running control value corresponding to at least one of an acceleration instruction, a deceleration instruction and a steering instruction of the at least one vehicle;
determine the at least one running control value so as to minimize a predetermined evaluation value, the predetermined evaluation value being calculated based on relative values of all pairs of two successive vehicles of the plurality of vehicles and the at least one running control value; and
control the running state of the at least one vehicle based on the at least one running control value of the at least one vehicle.

2. The row running control system according to claim 1, wherein the predetermined evaluation value is calculated by performing a weighting on the relative values and the at least one running control value, respectively.

3. The row running control system according to claim 1, wherein the relative values include at least one of inter-vehicle distance errors between two successive vehicles and relative speeds between two successive vehicles.

4. The row running control system according to claim 1, wherein the at least one running control value includes a running control value of a lead vehicle in the row.

5. The row running control system according to claim 4,
wherein the at least one running control value is calculated by performing a weighting on a target running control value of the lead vehicle and the running control values of succeeding vehicles in the row other than the lead vehicle, respectively, and
wherein weights in the weighting are determined based on a positional relationship between the lead vehicle and an obstacle that exists ahead of the lead vehicle.

6. The row running control system according to claim 3, wherein
the predetermined evaluation value is calculated by performing a weighting on the inter-vehicle distance errors between two successive vehicles in the row and the at least one running control value, respectively, and
weights in the weighting are determined based on running speeds of the respective vehicles.

7. The row running control system according to claim 1, further comprising the at least one vehicle, the at least one vehicle housing the electronic control unit.

8. A computer-implemented method of controlling a running state of at least one vehicle of a plurality of vehicles in a row so that the plurality of vehicles maintains the row, comprising:
calculating at least one running control value of the at least one vehicle of the plurality of vehicles, the at least one running control value corresponding to at least one of an acceleration instruction, a deceleration instruction and a steering instruction of the at least one vehicle;
determining the at least one running control value so as to minimize a predetermined evaluation value, the predetermined evaluation value being calculated based on relative values of all pairs of two successive vehicles from among the plurality of vehicles and the at least one running control value; and
controlling a control state of the at least one vehicle based on the calculated at least one running control value.

* * * * *